(12) United States Patent
Lomayev et al.

(10) Patent No.: US 10,651,978 B2
(45) Date of Patent: *May 12, 2020

(54) APPARATUS, SYSTEM AND METHOD OF COMMUNICATING A SINGLE CARRIER (SC) TRANSMISSION

(71) Applicant: INTEL CORPORATION, Santa Clara, CA (US)

(72) Inventors: Artyom Lomayev, Nizhny Novgorod (RU); Iaroslav P. Gagiev, Nizhny Novgorod (RU); Alexander Maltsev, Nizhny Novgorod (RU); Michael Genossar, Modiin (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,561

(22) Filed: May 5, 2019

(65) Prior Publication Data

US 2019/0372718 A1    Dec. 5, 2019

Related U.S. Application Data

(63) Continuation of application No. 15/390,634, filed on Dec. 26, 2016, now Pat. No. 10,326,558.

(Continued)

(51) Int. Cl.
*H04L 1/06* (2006.01)
*H04L 5/00* (2006.01)
(Continued)

(52) U.S. Cl.
CPC .......... *H04L 1/0643* (2013.01); *H04L 1/0041* (2013.01); *H04L 1/0057* (2013.01);
(Continued)

(58) Field of Classification Search
CPC combination set(s) only.
See application file for complete search history.

(56) References Cited

U.S. PATENT DOCUMENTS 7,873,021 B2    1/2011  Petre et al.
8,014,463 B2 *  9/2011  van Nee .............. H04B 7/0671
                                                348/388.1
(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Linda Wong
(74) *Attorney, Agent, or Firm* — Shichrur & Co.

(57) ABSTRACT

Some demonstrative embodiments include apparatus, system and method of communicating a Single Carrier (SC) transmission. For example, an apparatus of a SC Physical Layer (PHY) transmitter may include a spatial stream parser to distribute encoded bits of a Physical Layer Convergence Procedure (PLCP) Service Data Unit (PSDU) to a plurality of spatial streams; a plurality of constellation mappers to map encoded bits of the plurality of spatial streams into a respective plurality of streams of constellation symbols according to a constellation scheme; a Space Time Block Code (STBC) encoder to encode the plurality of streams of constellation symbols into SC symbol blocks over a plurality of space-time streams; and a transmit beamforming module to map the plurality of space-time streams to a plurality of transmit chains.

23 Claims, 8 Drawing Sheets

Related U.S. Application Data

(60) Provisional application No. 62/364,424, filed on Jul. 20, 2016.

(51) Int. Cl.
  *H04L 1/00* (2006.01)
  *H04L 27/26* (2006.01)

(52) U.S. Cl.
  CPC .......... *H04L 1/0618* (2013.01); *H04L 1/0625* (2013.01); *H04L 5/0023* (2013.01); *H04L 27/2636* (2013.01)

(56) References Cited

U.S. PATENT DOCUMENTS

| | | | |
|---|---|---|---|
| 8,391,414 B2 | 3/2013 | Shin et al. | |
| 8,588,317 B2 | 11/2013 | Giannakis et al. | |
| 8,638,761 B2 * | 1/2014 | Taghavi Nasrabadi | H04L 1/0606 370/335 |
| 8,824,600 B2 | 9/2014 | Nakamura et al. | |
| 9,548,759 B1 | 1/2017 | Rad | |
| 10,056,957 B2 * | 8/2018 | Han | H04B 7/0617 |
| 10,326,558 B2 | 6/2019 | Lomayev et al. | |
| 2007/0211815 A1 * | 9/2007 | Pan | H04B 7/0689 375/267 |
| 2009/0092182 A1 | 4/2009 | Shin et al. | |
| 2010/0002800 A1 | 1/2010 | Kim et al. | |
| 2010/0226415 A1 | 9/2010 | Mehta et al. | |
| 2011/0092241 A1 | 4/2011 | Kawai et al. | |
| 2011/0142076 A1 | 6/2011 | Ko et al. | |
| 2012/0140843 A1 | 6/2012 | Sartori et al. | |
| 2013/0142275 A1 * | 6/2013 | Baik | H04L 5/00 375/295 |
| 2013/0145239 A1 | 6/2013 | Pi et al. | |
| 2013/0208705 A1 | 8/2013 | Ko et al. | |
| 2015/0289147 A1 | 10/2015 | Lou et al. | |
| 2015/0349995 A1 * | 12/2015 | Zhang | H04L 5/0048 375/295 |
| 2015/0373707 A1 * | 12/2015 | Amini | H04W 24/04 370/336 |
| 2016/0013809 A1 * | 1/2016 | Myung | H03M 13/1165 714/776 |
| 2016/0316477 A1 * | 10/2016 | Negus | H04W 84/12 |
| 2017/0019281 A1 * | 1/2017 | Zhang | H04L 1/0057 |
| 2017/0033965 A1 | 2/2017 | Trainin et al. | |
| 2017/0034317 A1 * | 2/2017 | Kenney | H04L 27/2626 |
| 2017/0149591 A1 * | 5/2017 | Manolakos | H04L 5/0016 |
| 2017/0201357 A1 * | 7/2017 | Choi | H04L 27/2646 |
| 2017/0207830 A1 * | 7/2017 | Lomayev | H04L 27/2605 |
| 2017/0257250 A1 | 9/2017 | He et al. | |
| 2017/0310438 A1 | 10/2017 | Kim et al. | |
| 2018/0007673 A1 * | 1/2018 | Fwu | H04W 4/70 |
| 2018/0026749 A1 | 1/2018 | Lomayev et al. | |
| 2019/0013901 A1 * | 1/2019 | Nimbalker | H04L 1/0057 |

OTHER PUBLICATIONS

IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Office Action for U.S. Appl. No. 15/390,634, dated Dec. 4, 2017, 19 pages.

Office Action for U.S. Appl. No. 15/390,634, dated Jun. 28, 2018, 22 pages.

Office Action for U.S. Appl. No. 15/390,634, dated Nov. 13, 2018, 19 pages.

Notice of Allowance for U.S. Appl. No. 15/390,634, dated Feb. 5, 2019, 18 Pages.

Zhou et al, Single-Carrier Space-Time Block Coded Transmission over Frequency Selective Fading channels, IEEE Transactions on Information Theory, vol. 49, No. 1, Jan. 2003, pp. 164-179, 16 pages.

Lim et al, Space-Time Block Code Design for Single Carrier Frequency Division Multiple Access, IEEE 20th International Symposium on Personal, Indoor, and Mobile Radio Communications, 2009, pp. 516-520, 5 pages.

\* cited by examiner

APPARATUS, SYSTEM AND METHOD OF COMMUNICATING A SINGLE CARRIER (SC) TRANSMISSION

CROSS REFERENCE

This Application claims the benefit of and priority from U.S. Provisional Patent Application No. 62/364,424 entitled "APPARATUS, SYSTEM AND METHOD OF COMMUNICATING A SINGLE CARRIER (SC) TRANSMISSION", filed Jul. 20, 2016, the entire disclosure of which is incorporated herein by reference.

TECHNICAL FIELD

Embodiments described herein generally relate to communicating a single carrier (SC) transmission.

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
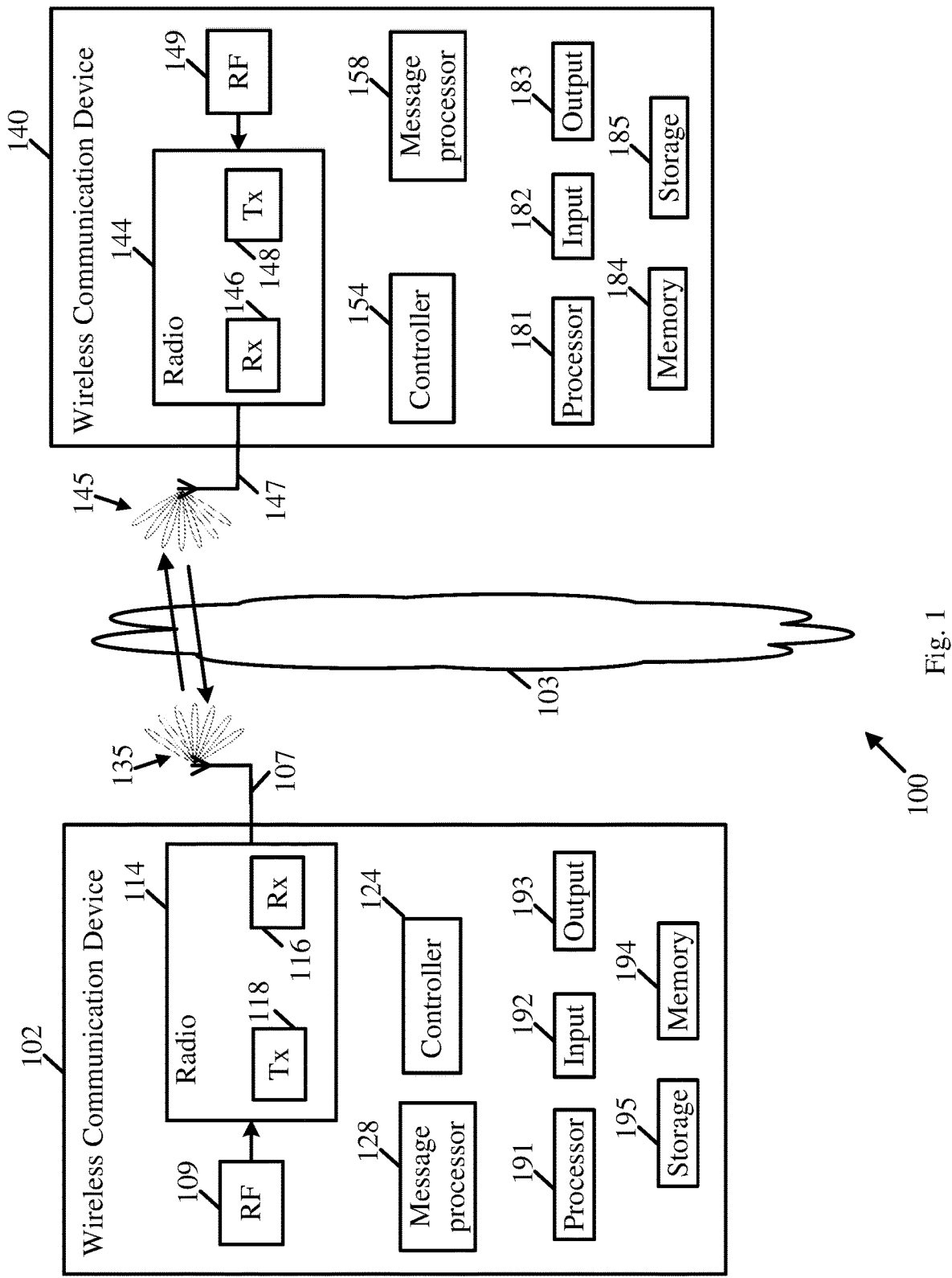
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac-2013 ("IEEE P802.11ac-2013, IEEE Standard for Information Technology—Telecommunications and Information Exchange Between Systems—Local and Metropolitan Area Networks Specific Requirements—Part 11: Wireless LAN Medium Access Control (MAC) and Physical Layer (PHY) Specifications—Amendment 4: Enhancements for Very High Throughput for Operation in Bands below 6*

GHz", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 December, 2012); IEEE-802.11REVmc ("*IEEE 802.11-REVmc™/D6.0, June 2016, draft standard for Information technology—Telecommunications and information exchange between systems Local and metropolitan area networks Specific requirements; Part 11: Wireless LAN Medium Access Control (MAC) and Physical Layer (PHY) Specification*"); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof, devices and/or networks operating in accordance with existing WiFi Alliance (WFA) Peer-to-Peer (P2P) specifications (including *WiFi P2P technical specification, version 1.5,* Aug. 4, 2015) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1,* April 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be includes as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be includes as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114.

In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Extended DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including, one or more IEEE 802.11 Specifications, e.g., an IEEE 802.11ad Specification, an IEEE 802.11REVmc Specification, an IEEE 802.11ay Specification, and/or any other specification and/or protocol.

Some demonstrative embodiments may be implemented, for example, as part of a new standard in an mmWave band, e.g., a 60 GHz frequency band or any other directional band, for example, as an evolution of an IEEE 802.11ad Specification.

In some demonstrative embodiments, devices 102 and/or 140 may be configured according to one or more standards, for example, in accordance with an IEEE 802.11ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase the data transmission rates defined in the IEEE 802.11ad Specification, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an IEEE 802.11ay Standard and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to implement one or more mechanisms, which may, for example, enable to extend a single-channel BW scheme, e.g., a scheme in accordance with the *IEEE 802.11ad Specification* or any other scheme, for higher data rates and/or increased capabilities, e.g., as described below.

In some demonstrative embodiments, devices 102 and/or 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, devices 102 and/or 140 may implement a transmitter architecture configured to process one or more portions of a frame, for example, at least a data part, e.g., at least a Physical Layer Convergence Procedure (PLCP) Service Data Unit (PSDU), of a frame, e.g., for a Single Carrier (SC) Physical Layer (PHY), e.g., as described below.

In some demonstrative embodiments, for example, transmitter 118 may include a SC PHY configured to process one or more SC transmissions to be transmitted by device 102, for example, according to a SC transmission scheme; and/or transmitter 148 may include a SC PHY configured to process one or more SC transmissions to be transmitted by device 140, for example, according to a SC transmission scheme, e.g., as described below.

In some demonstrative embodiments, transmitter 118 may implement a transmitter architecture, which may be configured, for example, to process one or more portions of a frame, e.g., at least the PSDU of the frame, for example, for one or more SC PHY elements of transmitter 118, e.g., as described below.

In some demonstrative embodiments, device 102 may implement a Single User (SU) transmitter architecture configured to process a SU transmission, e.g., as described below.

In some demonstrative embodiments, transmitter 118 may implement a transmitter 118SU transmitter architecture configured to process the SU transmission, e.g., as described below.

In some demonstrative embodiments, device 102 may implement a Multi User (MU) transmitter architecture configured to process a MU transmission, e.g., as described below.

In some demonstrative embodiments, transmitter 118 may implement a transmitter 118MU transmitter architecture configured to process the MU transmission, e.g., as described below.

In some demonstrative embodiments, a transmitter architecture, e.g., the SU and/or the MU transmitter architecture, may be configured to be implemented, for example, in accordance with a future *IEEE 802.11ay Specification*.

In some demonstrative embodiments, the transmitter architecture of transmitter 118 may be configured to support, for example, at least Single Input Single Output (SISO), Multiple Input Multiple Output (MIMO), channel bonding, and/or channel aggregation techniques, e.g., as described below.

In some demonstrative embodiments, for example, in case of a MIMO transmission, the transmitter architecture of transmitter 118 may be configured to apply a Space Time Block Coding (STBC) scheme, and/or a transmit beamforming or digital precoding scheme, e.g., as described below.

In some demonstrative embodiments, the transmitter architecture of transmitter 118 may be configured to support a SC symbol blocking structure, e.g., for SC PHY.

In some demonstrative embodiments, the transmitter architecture of transmitter 118 may be configured to support an STBC symbol blocking structure, e.g., for SC PHY.

In some demonstrative embodiments, definition, configuration and/or implementation of a transmitter architecture, which may be able to support SU and/or MU transmission using a SC PHY, may be different from, and/or may not be straightforward in view of, a transmitter architecture for an OFDM PHY.

In some demonstrative embodiments, devices 102 and/or 140 may implement a SU transmitter architecture configured to process a SU transmission for SC PHY, e.g., as described below.

In some demonstrative embodiments, transmitter 118 may implement a SU transmitter architecture, which may be configured to support a SU transmission with a SC PHY, e.g., as described below.

In some demonstrative embodiments, transmitter 118 may implement a SU transmitter architecture, which may include a MIMO transmitter architecture. For example, the MIMO transmitter architecture may be implemented, for example, in accordance with one or more design principles developed in a legacy *IEEE 802.11ac Standard*, and/or based on one or more additional or alternative design principles.

In some demonstrative embodiments, transmitter 118 may include, and/or may be configured to perform and/or apply, for example, one or more transformations, operations and/or processes, for example, at least to a data part, e.g., a PSDU.

In some demonstrative embodiments, transmitter 118 may include, and/or may be configured to perform and/or apply, for example, at least three transformations and/or processes, for example, at least to the PSDU, e.g., as described below.

In other embodiments, transmitter 118 may implement any other number of transformations, and/or operations, and/or may include one or more additional or alternative transformations and/or operations.

In some demonstrative embodiments, transmitter 118 may be configured to at least encode a PSDU, modulate the PSDU, and/or map the PSDU to a plurality of spatial streams, for example, including $N_{SS}$ spatial streams, e.g., as described below.

In some demonstrative embodiments, transmitter 118 may be configured to transform the $N_{SS}$ spatial streams into a plurality of space-time streams, for example, including $N_{STS}$ space-time streams, e.g., as described below.

In some demonstrative embodiments, transmitter 118 may be configured to assign the $N_{STS}$ space-time streams to a plurality of transmit chains, for example, including $N_{TX}$ transmit chains of RF chains 109, e.g., as described below.

Figure 2:
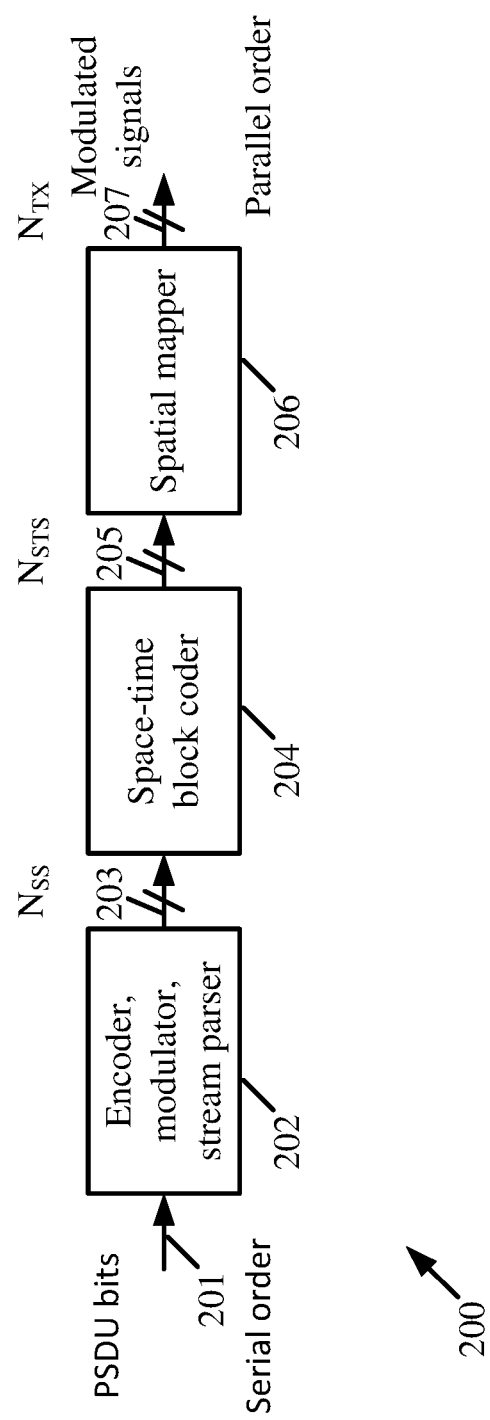
FIG. 2 is a schematic illustration of a process flow of a Multiple-Input-Multiple-Output (MIMO) transmitter, in accordance with some demonstrative embodiments.

Reference is made to FIG. 2, which schematically illustrates a process flow 200 of a MIMO transmitter, in accordance with some demonstrative embodiments. For example, transmitter 118B (FIG. 1) may perform one or more operations and/or functionalities of process flow 200, e.g., as described below.

In some demonstrative embodiments, as shown in FIG. 2, process flow 200 may include a plurality of transformations, for example, including at least three transformations. In other embodiments, process flow 200 may implement any other number of transformations, and/or operations, and/or may include one or more additional or alternative transformations and/or operations.

In some demonstrative embodiments, as shown in FIG. 2, process flow 200 may include, e.g., as part of a first process and/or transformation 202, encoding, modulating, and/or mapping a PSDU 201, e.g., in the form of a serial sequence of PSDU bits, to a plurality of spatial streams 203, for example, including $N_{SS}$ spatial streams.

In some demonstrative embodiments, as shown in FIG. 2, process flow 200 may include, e.g., as part of a second process and/or transformation 204, transforming the plurality of spatial streams 203 into a plurality of space-time streams 205, for example, including $N_{STS}$ space-time streams.

In some demonstrative embodiments, as shown in FIG. 2, process flow 200 may include, e.g., as part of a third process and/or transformation 204, assigning the plurality of space-time streams 205 to a plurality of transmit chains 207, for example, including $N_{TX}$ transmit chains, e.g., $N_{TX}$ transmit chains of RF chains 109 (FIG. 1).

Referring back to FIG. 1, in some demonstrative embodiments devices 102 and/or 140 may be configured to implement a transmitter architecture (also referred to as "SC PHY transmitter"), which may be configured to support one or more SC PHY transmitter features, e.g., as described below. For example, transmitter 118 may include a SC PHY transmitter architecture, which may be configured to support one or more SC PHY transmitter features of transmitter 118, e.g., as described below.

In some demonstrative embodiments, transmitter 118 and/or transmitter 148 may implement a SC PHY transmitter architecture, which may be configured to support a maximum total number of eight spatial streams. In other embodiments, the SC PHY transmitter architecture may be configured to support any other number of spatial streams, for example, less than eight streams or more than eight streams, e.g., 16 streams, 32 streams, and/or any other number of streams.

In some demonstrative embodiments, transmitter 118 and/or transmitter 148 may implement a SC PHY transmitter architecture, which may be configured to implement a vertical coding, e.g., in accordance with an *IEEE 802.11ac Specification* and/or any other type of vertical coding, for example, to encode a plurality of spatial streams, e.g., all spatial streams, by applying a same EDMG Modulation and Coding Scheme (EDMG-MCS).

In some demonstrative embodiments, transmitter 118 and/or transmitter 148 may implement a SC PHY transmitter architecture, which may be configured to implement a channel bonding, for example, according to a Channel bonding factor, denoted $N_{CB}$, for example, $N_{CB}$=1, 2, 3, and 4, wherein $N_{CB}$=1 corresponds to a legacy non-bonded case, and/or any other channel bonding factor.

In some demonstrative embodiments, transmitter 118 and/or transmitter 148 may implement a SC PHY transmitter architecture, which may be configured to implement a channel aggregation, for example, of a maximum 2 frequency channels, and/or any other number of aggregated channels. In one example, the SC PHY transmitter architecture may be configured to implement a channel aggregation of two 2.16 GHz channels.

In some demonstrative embodiments, the channel aggregation may be considered as a type of MIMO with "zero" cross links, for example, assuming that frequency channels are well isolated.

In some demonstrative embodiments, transmitter 118 and/or transmitter 148 may implement a SC PHY transmitter architecture, which may be configured to support a plurality of types, e.g., three types, of Guard Intervals (GIs), e.g., as described below. In other embodiments, the SC PHY transmitter architecture may be configured to support some or all of the three GI types, only one GI type, and/or any other number of GI types, e.g., less than or more than three GI types.

In some demonstrative embodiments, transmitter 118 and/or transmitter 148 may implement a SC PHY transmitter architecture, which may be configured to support a short GI, for example, a GI of a of length of $N_{GI}$=32 chips, e.g., at 1.76 Giga samples per second (Gsps), for example, to allow at least optimizing overhead for short range applications.

In some demonstrative embodiments, transmitter 118 and/or transmitter 148 may implement a SC PHY transmitter architecture, which may be configured to support a medium GI, for example, a GI of a length of $N_{GI}$=64 chips, for example, to coincide with a legacy case.

In some demonstrative embodiments, transmitter 118 and/or transmitter 148 may implement a SC PHY transmitter architecture, which may be configured to support a Long GI, e.g., a GI of a length of $N_{GI}$=128 chips, for example, to be applied for large scale environments.

In some demonstrative embodiments, transmitter 118 and/or transmitter 148 may implement a SC PHY transmitter architecture, which may be configured to support any other additional or alternative GI types, e.g., of any other length.

In some demonstrative embodiments, transmitter 118 and/or transmitter 148 may implement a SC PHY transmitter architecture, which may be configured to support Space-Time Block Coding (STBC), for example, based on an Alamouti scheme and/or any other STBC scheme, e.g., as described below.

In some demonstrative embodiments, transmitter 118 and/or transmitter 148 may implement a SC PHY transmitter architecture, which may be configured to support a count of the plurality of space-time streams, which is a multiple of a count of the plurality of spatial streams.

In some demonstrative embodiments, the count of the plurality of space-time streams may be double the count of the plurality of spatial streams, for example, $N_{STS}=2*N_{SS}$.

In some demonstrative embodiments, the number of space-time streams may be limited by 8, for example, $N_{STS}<8$, e.g., in accordance with an *IEEE* 802.11*ac Standard*. According to these embodiments, four spatial streams may be supported, e.g., $N_{SS}=1, 2, 3, 4$, and $N_{STS}=2*N_{SS}$.

In other embodiments, any other number of space-time streams and/or any other number of spatial streams may be implemented.

In some demonstrative embodiments, transmitter 118 and/or transmitter 148 may implement a SC PHY transmitter architecture, which may be configured to support a Transmit Beamforming (TxBF) technique, e.g., as described below.

In some demonstrative embodiments, transmitter 118 and/or transmitter 148 may implement a SC PHY transmitter architecture, which may be configured to support a precoding scheme, which may, for example, apply only a Wideband precoding, e.g., using a precoding matrix V, which may be independent on the subcarrier index and constant over subcarriers.

In some demonstrative embodiments, transmitter 118 and/or transmitter 148 may implement a SC PHY transmitter architecture, which may be configured to support a precoding scheme, which may, for example, be applied for a Short training Field (STF) and/or Channel Estimation Filed (CEF), e.g., an EDMG-STF/EDMG-CEF, and/or data part of the frame, for example, possibly to the Automatic Gain Control (AGC) and/or Training (TRN) units.

In other embodiments, transmitter 118 and/or transmitter 148 may implement a SC PHY transmitter architecture, which may be configured to support any other additional or alternative precoding scheme.

In some demonstrative embodiments, transmitter 118 and/or transmitter 148 may implement a SC PHY transmitter architecture, which may be configured to support a low-density parity-check (LDPC) code, for example, an LDP with encoding rates of 1/2, 5/8, 3/4, 13/16, and/or 7/8, and/or any other code rate.

In one example, at least two types of LDPC codewords may be supported, e.g., as described below.

In some demonstrative embodiments, transmitter 118 and/or transmitter 148 may implement a SC PHY transmitter architecture, which may be configured to support a Short CW, e.g., a CW with a length of CW=672 bits, for example, for code rates 1/2, 5/8, 3/4, and/or 13/16, and/or a CW with a length of 624 bits, e.g., for a code rate 7/8.

In some demonstrative embodiments, transmitter 118 and/or transmitter 148 may implement a SC PHY transmitter architecture, which may be configured to support a Long CW, for example, a CW with a length of CW=1344 bits, e.g., for code rates 1/2, 5/8, 3/4, and/or 13/16, and/or a CW with a length of 1248 bits, e.g., for a code rate 7/8.

In other embodiments, any other additional or alternative code rate and/or CW length may be implemented.

In some demonstrative embodiments, transmitter 118 and/or transmitter 148 may implement a SC PHY transmitter architecture, which may be configured to support one or more legacy modulation types, e.g., according to one or more existing *IEEE* 802.11 *Specifications*, e.g., as described below.

In some demonstrative embodiments, transmitter 118 and/or transmitter 148 may implement a SC PHY transmitter architecture, which may be configured to support a $\pi/2$-BPSK modulation, a $\pi/2$-QPSK modulation, a $\pi/2$-16QAM modulation, and/or a $\pi/2$-64QAM modulation.

In some demonstrative embodiments, transmitter 118 and/or transmitter 148 may implement a SC PHY transmitter architecture, which may be configured to support a modulation scheme, which may be configured as an Extension to a $\pi/2$-256QAM modulation, for example, as an alternative to channel bonding.

In some demonstrative embodiments, transmitter 118 and/or transmitter 148 may implement a SC PHY transmitter architecture, which may be configured to support one or more Non Uniform Constellations (NUCs), for example, for higher order modulations, e.g., for 64QAM. In one example, it may be proposed not to exclude the legacy $\pi/2$-64QAM modulation, but rather to supplement it with advanced NUC types.

In some demonstrative embodiments, transmitter 118 and/or transmitter 148 may implement an SC PHY transmitter architecture (also referred to as a "SU transmitter architecture"), which may be configured to process a SU transmission for SC PHY. For example, the SU transmitter architecture may be configured to process at least a PSDU part of a frame, for example, for a total number of $N_{SS}$ spatial streams, for example, $N_{SS}=8$ streams or any other number of streams, e.g., as described below.

In some demonstrative embodiments, SU transmitter architecture may be implemented according to on or more implementation options, for example, including a first implementation option ("option 1"), and/or a second implementation option ("option 2"), e.g., as described below.

Figure 3:
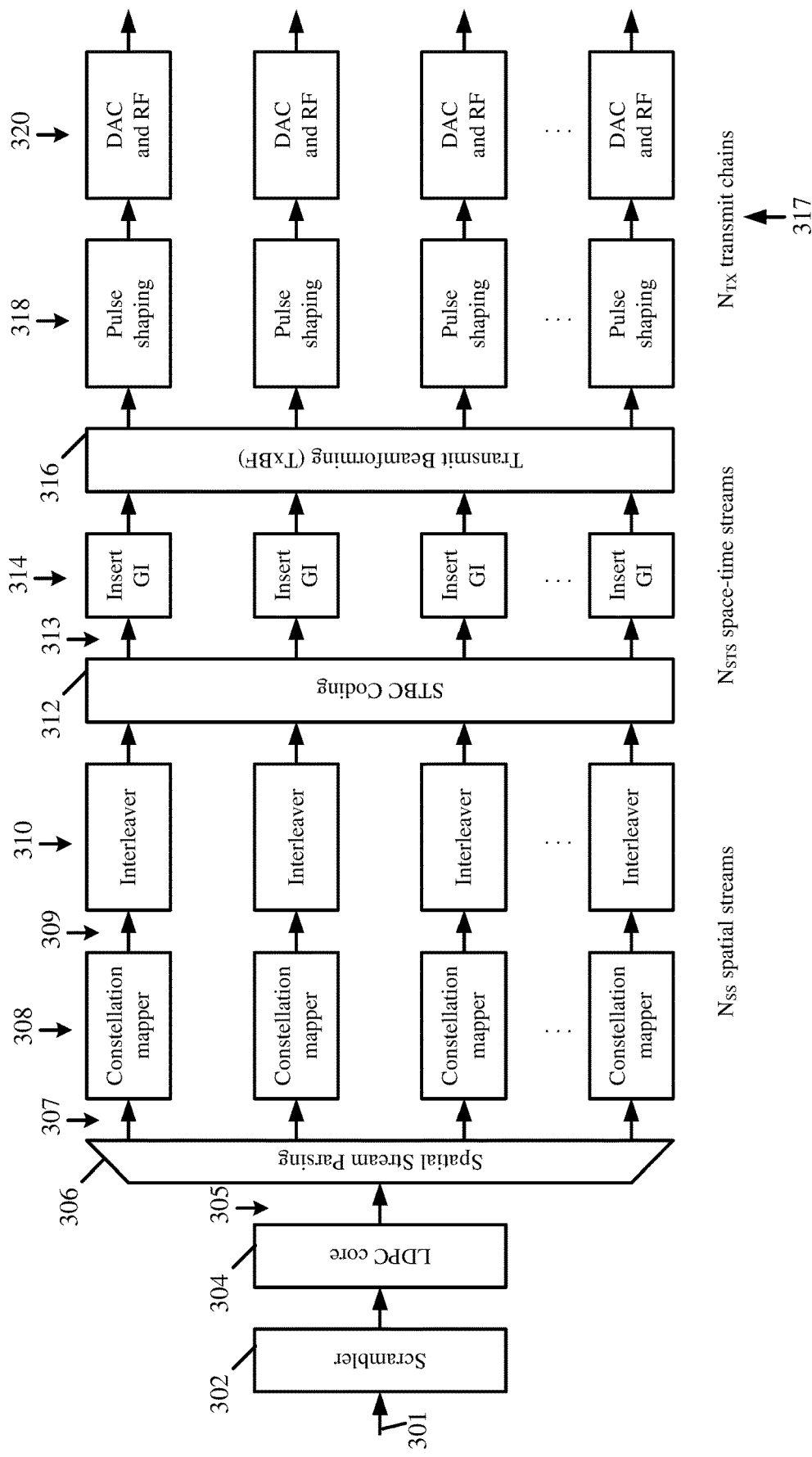
FIG. 3 is a schematic illustration of a Single User (SU) transmitter architecture, in accordance with some demonstrative embodiments.

Reference is made to FIG. 3, which schematically illustrates an SU transmitter architecture 300, in accordance with some demonstrative embodiments. In one example, transmitter 118 (FIG. 1) and/or transmitter 148 (FIG. 1) may be implemented according to, and/or may include one or more elements of, SU transmitter architecture 300.

In some demonstrative embodiments, SU transmitter architecture 300 may be configured to encode and modulate a PSDU 301, e.g., as described below. For example, PSDU 301 may include a serial stream of PSDU bits, e.g., representing a PSDU of a frame to be transmitted in a SU transmission. In one example, transmitter 118 (FIG. 1) may process PSDU 301 of a SU transmission, e.g., to device 140 (FIG. 1).

In some demonstrative embodiments, as shown in FIG. 3, transmitter architecture 300 may include a spatial stream parser 306 configured to distribute encoded bits 305 of PSDU 301 to a plurality of spatial streams 307, e.g., including $N_{SS}$ spatial streams. For example, encoded bits 305 may be generated by an encoder 304, based on a suitable encoding scheme, for example, an LDPC encoding and/or any other encoding, e.g., as described below.

In some demonstrative embodiments, as shown in FIG. 3, transmitter architecture 300 may include a scrambler 302 configured to scramble bits of PSDU 301.

In some demonstrative embodiments, scrambler 302 may implement a scrambling scheme, for example, in compliance with of an *IEEE* 802.11*ad Specification*.

In some demonstrative embodiments, scrambler 302 may be configured to apply Codeword (CW) padding, for example, by padding the PSDU 301 at an input of encoder 304 with $N_{DATA\_PAD}$ bits, for example, to have an integer number of LDPC codewords, e.g., in accordance with a CW padding of an *IEEE* 802.11*ad Specification*.

In some demonstrative embodiments, as shown in FIG. 3, encoder 304 may include an LDPC encoder ("LDPC core") to encode the PSDU 301 into the encoded bits 305, for example, according to an LDPC code.

In some demonstrative embodiments, encoder 304 may be configured to encode the PSDU into an LDPC CW including a short CW or a long CW, e.g., as decried below.

In some demonstrative embodiments, the short CW may include 672 or 624 bits, and/or the long CW may include 1344 or 1248 bits. In other embodiments, the short CW and/or the long CW may include any other number of bits.

In some demonstrative embodiments, encoder 304 may be configured to implement a SC block padding scheme to pad bits of the PSDU. For example, encoded bits at the output of encoder 304 may be padded with $N_{BLK\_PAD}$ bits, e.g., to have an integer number of SC symbol blocks.

In some demonstrative embodiments, spatial stream parser 306 may be configured to distribute the encoded bits to the plurality of spatial streams 307, for example, based on a round robin mechanism.

In one example, spatial stream parser 306 may be configured to perform spatial stream parsing. For example, a flow of sequential bits 305 may be equally distributed between the plurality of spatial streams 307, for example, in a round robin manner and/or according to any other parsing/distribution scheme, e.g., on a bit basis.

In some demonstrative embodiments, the plurality of spatial streams 307 may have a same Modulation and Coding Scheme (MCS).

In some demonstrative embodiments, the plurality of spatial streams 307 may include no more than 8 spatial streams. In other embodiments, the plurality of spatial streams 307 may include any other number of spatial streams.

In some demonstrative embodiments, as shown in FIG. 3, transmitter architecture 300 may include a plurality of constellation mappers 308 configured to map encoded bits of the plurality of spatial streams 307 into a respective plurality of streams of constellation symbols 309, for example, according to a constellation scheme implemented by transmitter 118 (FIG. 1).

In some demonstrative embodiments, as shown in FIG. 3, transmitter architecture 300 may include a plurality of interleavers 310 configured to interleave symbols of respective ones of the plurality of streams of constellation symbols 309.

In some demonstrative embodiments, an interleaver 310 corresponding to a stream of the plurality of streams of constellation symbols 309, may be configured to interleave, e.g., on a symbol basis, symbols of an SC symbol block of the stream of constellation symbols.

In one example, an interleaver 310 may apply an interleaving configured for 64QAM and/or 256QAM modulations, and/or any other modulation.

In some demonstrative embodiments, as shown in FIG. 3, SU transmitter architecture 300 may include an STBC encoder 312 to encode the plurality of streams of constellation symbols 309 into SC symbol blocks over a plurality of space-time streams 313.

In some demonstrative embodiments, STBC encoder 312 may be configured to perform an SC symbol blocking and/or a space-time block coding, e.g., according to an STBC scheme.

In some demonstrative embodiments, a count of the plurality of space-time streams 313 may be based on a type of the STBC scheme.

In some demonstrative embodiments, the count of the plurality of space-time streams 313 may be a multiple of a count of the plurality of spatial streams 307.

In one example, the count of the plurality of space-time streams 313 may be double the count of the plurality of spatial streams 307, for example, if the STBC scheme includes a 2×1 scheme, which utilizes two space-time steams two encode each spatial stream.

In some demonstrative embodiments, a count of the plurality of space-time streams 313 may include no more than 8 space-time streams. In other embodiments, the count of the plurality of space-time streams 313 may include any other number of streams.

In some demonstrative embodiments, as shown in FIG. 3, transmitter architecture 300 may include a transmit beamforming module 316 ("TxBF") to map the plurality of space-time streams 313 to a plurality of transmit chains 317. For example, transmit chains 317 may include one or more transmit chains of RF chains 109 (FIG. 1).

In some demonstrative embodiments, transmit beamforming module 316, may be configured to perform digital precoding of a transmit waveform, for example, based on a Channel State Information (CSI) feedback from a receiver, and/or based on any other beamforming scheme.

In some demonstrative embodiments, as shown in FIG. 3, transmitter architecture 300 may include a plurality of GI inserters 314 configured to insert GI sequences to the SC symbol blocks, for example, over the plurality of space-time streams 313.

In some demonstrative embodiments, the GI sequences may have a GI length of 32, 64, or 128 samples. In other embodiments, the GI sequences may have a GI length of any other number of samples.

In some demonstrative embodiments, a GI inserter 314 may be configured to prepend each SC symbol block with a GI sequence, and/or to add an extra GI at the end of a data part of a frame.

In some demonstrative embodiments, transmitter architecture 300 may be configured to transmit a SC transmission based on PSDU 301, e.g., to device 104 (FIG. 1).

In some demonstrative embodiments, transmitter architecture 300 may be configured to transmit the SC transmission over a bonded channel and/or an aggregated channel including a plurality of channels.

In one example, transmitter architecture 300 may be configured to apply an output waveform for the SC transmission. For example, the waveform may be defined at an $N_{CB}*1.76$ GHz chip rate, wherein $N_{CB}$ denotes a bonding factor, e.g., a bonding factor equal to 1, 2, 3, or 4, or any other bonding factor.

In some demonstrative embodiments, transmitter architecture 300 may be configured to transmit the SC transmission via the plurality of transmit chains 317 over a Directional Multi-Gigabit (DMG) band.

In some demonstrative embodiments, as shown in FIG. 3, transmitter architecture 300 may include a plurality of pulse shaping filters 318 configured to filter the SC transmission over the plurality of transmit chains.

In some demonstrative embodiments, as shown in FIG. 3, transmitter architecture 300 may include a plurality of Digital to Analog (DAC) convertors, and/or RF processing modules 320, configured to convert the SC transmission from digital to analog, and/or to perform RF processing of the SC transmission.

In some demonstrative embodiments, SU transmitter architecture 300 may include one or more other components, elements, and/or modules configured to process and/or to transmit the SU SC transmission.

Referring back to FIG. 1, in some demonstrative embodiments, devices 102 and/or 140 may implement an SU transmitter architecture configured to process the SU transmission for SC PHY according to a second option, e.g., as described below.

In some demonstrative embodiments, the SU transmitter architecture according to the second option may not utilize interleaves, e.g., the plurality of interleaves 310 (FIG. 3).

Figure 4:
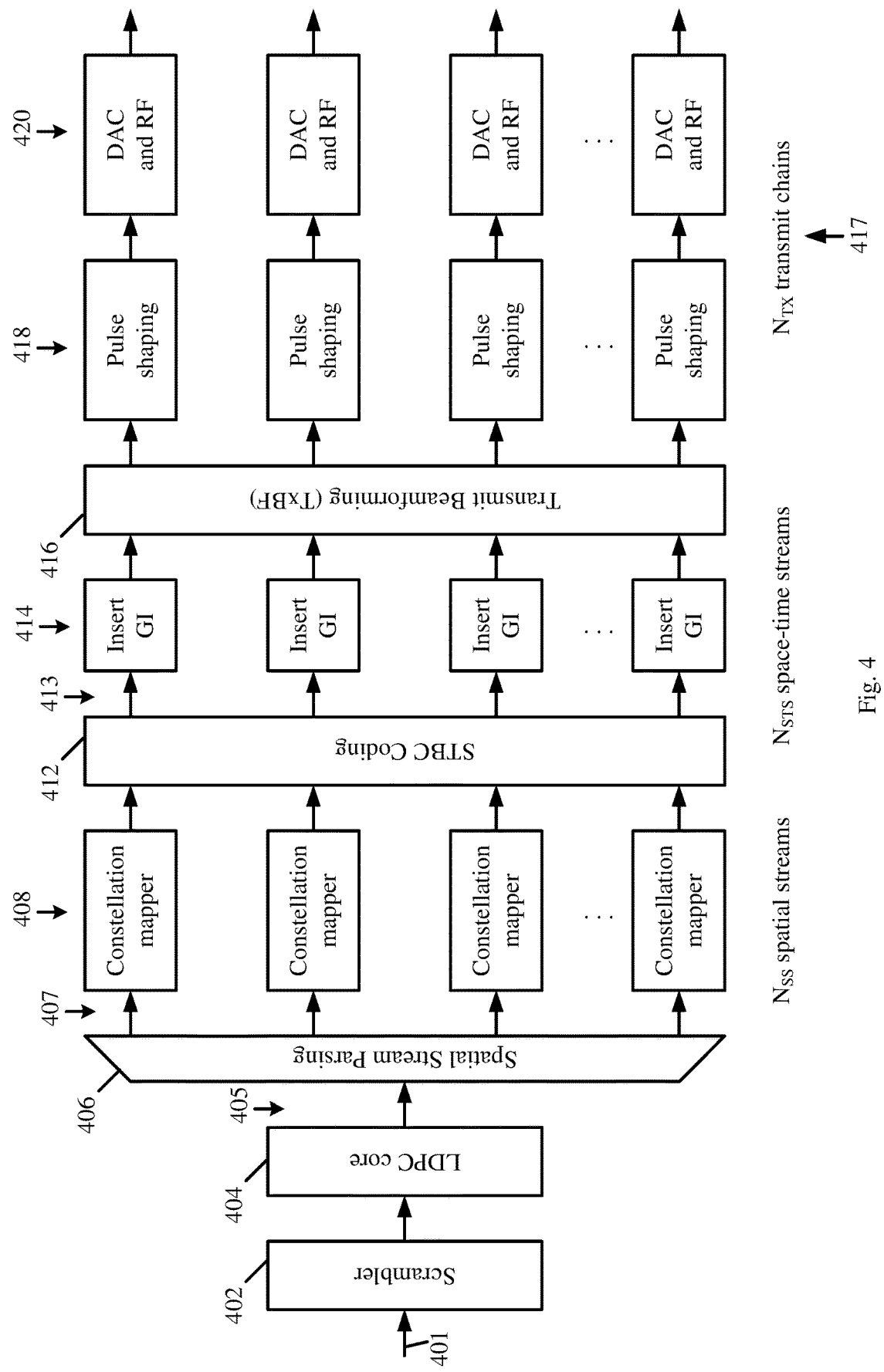
FIG. 4 is a schematic illustration of a SU transmitter architecture, in accordance with some demonstrative embodiments.

Reference is made to FIG. 4, which schematically illustrates an SU transmitter architecture 400, in accordance with some demonstrative embodiments. In one example, transmitter 118 (FIG. 1) and/or transmitter 148 (FIG. 1) may be implemented according to, and/or may include one or more elements of, SU transmitter architecture 400.

In some demonstrative embodiments, SU transmitter architecture 400 may be configured to encode and modulate a PSDU 401, e.g., as described below. For example, PSDU 401 may include a serial stream of PSDU bits, e.g., representing a PSDU of a frame to be transmitted in a SU transmission. In one example, transmitter 118 (FIG. 1) may process PSDU 401 of a SU transmission, e.g., to device 140 (FIG. 1).

In some demonstrative embodiments, as shown in FIG. 4, transmitter architecture 400 may include a spatial stream parser 406 configured to distribute encoded bits 405 of PSDU 401 to a plurality of spatial streams 407, e.g., including $N_{SS}$ spatial streams. For example, encoded bits 405 may be generated by an encoder 404, based on a suitable encoding scheme, for example, an LDPC encoding and/or any other encoding, e.g., as described below.

In some demonstrative embodiments, as shown in FIG. 4, transmitter architecture 400 may include a scrambler 402 configured to scramble bits of PSDU 401.

In some demonstrative embodiments, scrambler 402 may be, for example, in compliance with of an *IEEE* 802.11*ad Specification*.

In some demonstrative embodiments, scrambler 402 may be configured to apply Codeword (CW) padding, for example, by padding the PSDU 401 at an input of encoder 404 with $N_{DATA\_PAD}$ bits, for example, to have an integer number of LDPC codewords, e.g., in accordance with a CW padding of an *IEEE* 802.11*ad Specification*.

In some demonstrative embodiments, as shown in FIG. 4, encoder 404 may include an LDPC encoder ("LDPC core") to encode the PSDU 401 into the encoded bits 405, for example, according to an LDPC code.

In some demonstrative embodiments, encoder 404 may be configured to encode the PSDU into an LDPC CW including a short CW or a long CW, e.g., as decried below.

In some demonstrative embodiments, the short CW may include 672 or 624 bits, and/or the long CW may include 1344 or 1248 bits. In other embodiments, the short CW and/or the long CW may include any other number of bits.

In some demonstrative embodiments, encoder 404 may be configured to implement a SC block padding scheme to pad bits of the PSDU. For example, encoded bits at the output of encoder 404 may be padded with $N_{BLK\_PAD}$ bits, e.g., to have an integer number of SC symbol blocks.

In some demonstrative embodiments, spatial stream parser 406 may be configured to distribute the encoded bits to the plurality of spatial streams 407, for example, based on a round robin mechanism.

In one example, spatial stream parser 406 may be configured to perform spatial stream parsing. For example, a flow of sequential bits 405 may be equally distributed between the plurality of spatial streams 407, for example, in a round robin manner and/or according to any other parsing/distribution scheme, e.g., on a bit basis.

In some demonstrative embodiments, the plurality of spatial streams 407 may have a same Modulation and Coding Scheme (MCS).

In some demonstrative embodiments, the plurality of spatial streams 407 may include no more than 8 spatial streams. In other embodiments, the plurality of spatial streams 407 may include any other number of spatial streams.

In some demonstrative embodiments, as shown in FIG. 4, transmitter architecture 400 may include a plurality of constellation mappers 408 configured to map encoded bits of the plurality of spatial streams 407 into a respective plurality of streams of constellation symbols 409, for example, according to a constellation scheme implemented by transmitter 118 (FIG. 1).

In some demonstrative embodiments, as shown in FIG. 4, SU transmitter architecture 400 may include an STBC encoder 412 to encode the plurality of streams of constellation symbols 409 into SC symbol blocks over a plurality of space-time streams 413.

In some demonstrative embodiments, as shown in FIG. 4, transmitter architecture 400 may not utilize an interleaving functionality. For example, STBC encoder 412 may process the SC symbol blocks from constellation mapper 408, e.g., without interleaving.

In some demonstrative embodiments, STBC encoder 412 may be configured to perform an SC symbol blocking and/or a space-time block coding, e.g., according to an STBC scheme.

In some demonstrative embodiments, a count of the plurality of space-time streams 413 may be based on a type of the STBC scheme.

In some demonstrative embodiments, the count of the plurality of space-time streams 413 may be a multiple of a count of the plurality of spatial streams 407.

In one example, the count of the plurality of space-time streams 413 may be double the count of the plurality of spatial streams 407, for example, if the STBC scheme includes a 2×1 scheme, which utilizes two space-time steams two encode each spatial stream.

In some demonstrative embodiments, a count of the plurality of space-time streams 413 may include no more than 8 space-time streams. In other embodiments, the count of the plurality of space-time streams 413 may include any other number of streams.

In some demonstrative embodiments, as shown in FIG. 4, transmitter architecture 400 may include a transmit beamforming module 416 ("TxBF") to map the plurality of space-time streams 413 to a plurality of transmit chains 417. For example, transmit chains 417 may include one or more transmit chains of RF chains 109 (FIG. 1).

In some demonstrative embodiments, transmit beamforming module 416, may be configured to perform digital precoding of a transmit waveform, for example, based on a Channel State Information (CSI) feedback from a receiver, and/or based on any other beamforming scheme.

In some demonstrative embodiments, as shown in FIG. 4, transmitter architecture 400 may include a plurality of GI inserters 414 configured to insert GI sequences to the SC symbol blocks, for example, over the plurality of space-time streams 413.

In some demonstrative embodiments, the GI sequences may have a GI length of 32, 64, or 128 samples. In other embodiments, the GI sequences may have a GI length of any other number of samples.

In some demonstrative embodiments, a GI inserter 414 may be configured to prepend each SC symbol block with a GI sequence, and/or to add an extra GI at the end of a data part of a frame.

In some demonstrative embodiments, transmitter architecture 400 may be configured to transmit a SC transmission based on PSDU 401, e.g., to device 104 (FIG. 1).

In some demonstrative embodiments, transmitter architecture 400 may be configured to transmit the SC transmission over a bonded channel and/or an aggregated channel including a plurality of channels.

In one example, transmitter architecture 400 may be configured to apply an output waveform for the SC transmission. For example, the waveform may be defined at an $N_{CB}*1.76$ GHz chip rate, wherein $N_{CB}$ denotes a bonding factor, e.g., a bonding factor equal to 1, 2, 3, or 4, or any other bonding factor.

In some demonstrative embodiments, transmitter architecture 400 may be configured to transmit the SC transmission via the plurality of transmit chains 417 over a Directional Multi-Gigabit (DMG) band.

In some demonstrative embodiments, as shown in FIG. 4, transmitter architecture 400 may include a plurality of pulse shaping filters 418 configured to filter the SC transmission over the plurality of transmit chains.

In some demonstrative embodiments, as shown in FIG. 4, transmitter architecture 400 may include a plurality of Digital to Analog (DAC) convertors, and/or RF processing modules 420, configured to convert the SC transmission from digital to analog, and/or to perform RF processing of the SC transmission.

In some demonstrative embodiments, SU transmitter architecture 400 may include one or more other components, elements, and/or modules configured to process and/or to transmit the SU SC transmission.

Referring back to FIG. 1, in some demonstrative embodiments, devices 102 and/or 140 may be configured to implement a MU SC PHY transmitter having an architecture ("MU transmitter architecture" or "MU SC transmitter architecture") which may be configured to support one or more SC PHY features for a MU transmission, e.g., as described below. For example, transmitter 118 and/or transmitter 148 may be configured to implement the MU SC PHY transmitter architecture.

In some demonstrative embodiments, the MU SC transmitter architecture may be configured to support MU transmission, for example, at least a MU for a downlink, e.g., from an AP station to a plurality of client and/or user stations.

In some demonstrative embodiments, the MU SC transmitter architecture may be configured to support processing of a non-EDMG and/or an EDMG portion of a preamble, e.g., according to an *IEEE* 802.11*ay Specification*.

In some demonstrative embodiments, the MU SC transmitter architecture may be configured to support a Header-B encoding and modulation method.

In some demonstrative embodiments, the MU SC transmitter architecture may be configured to support one or more parameters of an MU transmission, e.g., as described below.

In some demonstrative embodiments, the MU SC transmitter architecture may be configured to support a maximum total number of MU clients equal to 16. In other embodiments, any other number of MU clients may be supported.

In some demonstrative embodiments, the MU SC transmitter architecture may be configured to support a maximum total number of space-time streams per user, which may be limited to 4, e.g., achieved by a dual-polarization and/or a channel aggregation of 2.16+2.16 GHz. In other embodiments, any other number of space-time streams per user may be supported.

In some demonstrative embodiments, the MU SC transmitter architecture may be configured to support a total number of $N_{SS}$ spatial streams summed over all users, which may be limited to 16. In other embodiments, any other total number of $N_{SS}$ may be supported.

In some demonstrative embodiments, the MU SC transmitter architecture may be configured to perform client PSDU encoding and/or modulation independently, and, for example, to combine the payloads of the users at a transmit beamforming stage. In other embodiments, the client PSDU encoding and modulation may be performed at a different stage.

In some demonstrative embodiments, the MU SC transmitter architecture may be configured to support individual selection of an MCS and and/or a number $N_{SS}$ of spatial streams, e.g., for each user. In other embodiments, the same MCS and/or the number $N_{SS}$ of spatial streams may be selected for two or more users.

In some demonstrative embodiments, the MU SC transmitter architecture may be configured to allow different users to have a different LDPC encoder type, e.g., having a short or a long CW length, e.g., as described below.

In some demonstrative embodiments, the MU SC transmitter architecture may be configured to identically apply the same one or more parameters for two or more users, e.g., for all users.

In some demonstrative embodiments, the MU SC transmitter architecture may be configured to identically apply the same bandwidth for MU transmission to two or more users, e.g., for all users.

In some demonstrative embodiments, the MU SC transmitter architecture may be configured to identically apply a same STBC scheme, e.g., if applied, for two or more users, e.g., for all users.

In some demonstrative embodiments, the MU SC transmitter architecture may be configured to identically apply the same GI type, e.g., a short, medium, or a long GI, for two or more users, e.g., for all users.

In some demonstrative embodiments, devices 102 and/or 140 may implement a MU transmitter architecture, which may be configured to process a PSDU part of a frame, for example, for a total number of $N_{SS}$ spatial streams, for example, $N_{SS}$ Equal to 16, e.g., as described below. In other embodiments, any other number of spatial streams may be implemented.

In some demonstrative embodiments, the MU transmitter architecture may be implemented according to on or more implementation options, for example, including a first implementation option ("option 1"), and/or a second implementation option ("option 2"), e.g., as described below.

Figure 5:
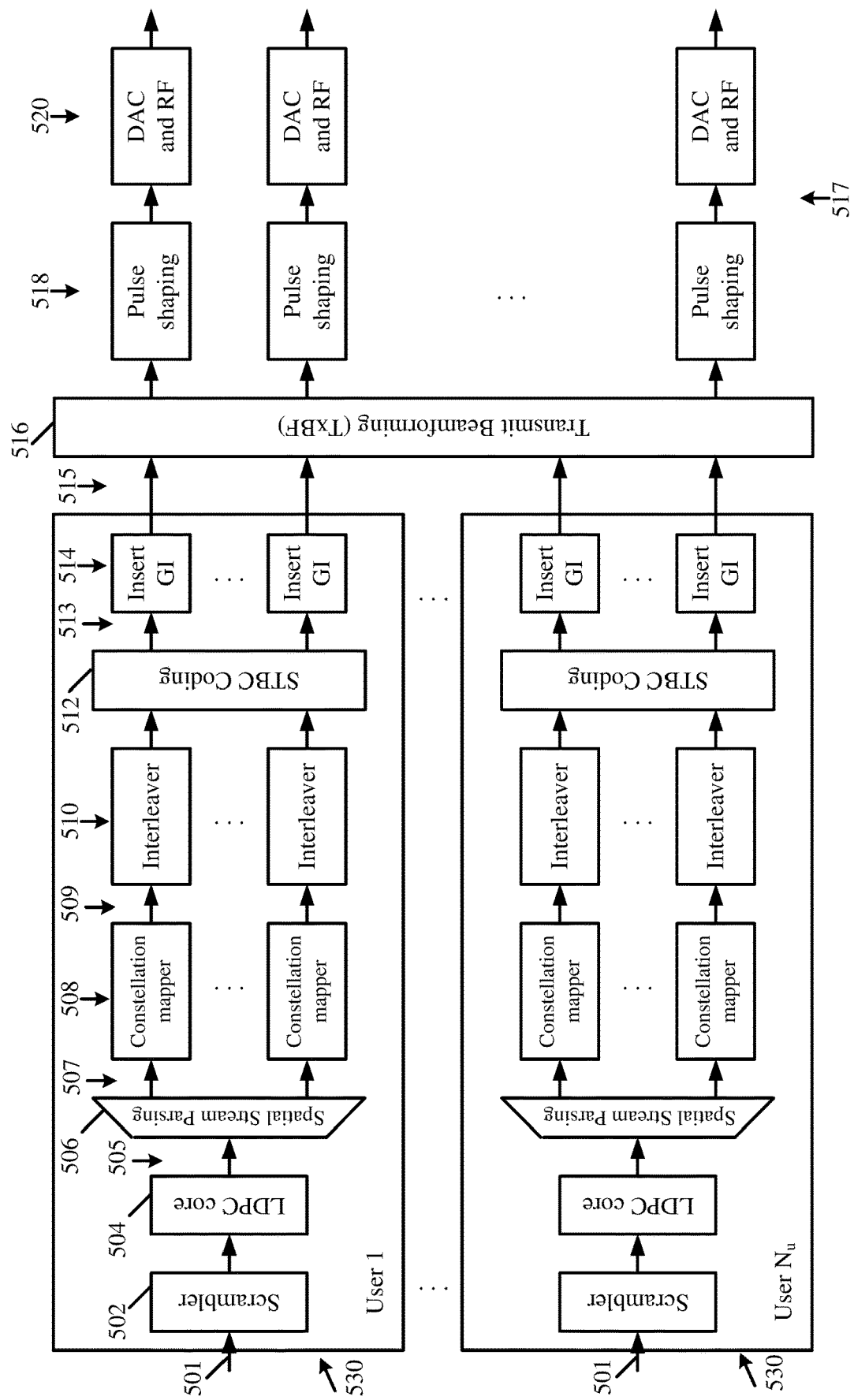
FIG. 5 is a schematic illustration of a Multi User (MU) transmitter architecture, in accordance with some demonstrative embodiments.

Reference is made to FIG. 5, which schematically illustrates a MU transmitter architecture 500, in accordance with some demonstrative embodiments. In one example, transmitter 118 (FIG. 1) and/or transmitter 148 (FIG. 1) may be implemented according to, and/or may include one or more elements of, MU transmitter architecture 500.

In some demonstrative embodiments, MU transmitter architecture 500 may be configured to encode and modulate a plurality of PSDUs 501 to be transmitted to a plurality of respective users, e.g., as described below. For example, a PSDU 501 may include a serial stream of PSDU bits, e.g., representing a PSDU of a frame to be transmitted to a user in a MU transmission. In one example, transmitter 118 (FIG.

1) may process PSDUs 501 of a MU transmission to a plurality of users, e.g., including device 140 (FIG. 1).

In some demonstrative embodiments, MU transmitter architecture 500 may be configured to encode and modulate the plurality of PSDUs 501, e.g., as described below.

In some demonstrative embodiments, MU transmitter architecture 500 may be configured to perform PSDU encoding and modulation, for example, independently for each user, e.g., as described above with reference to the SU transmitter 300 (FIG. 3).

In one example, an MU transmitter architecture 500 of an Access Point (AP) station may be configured to use its own random generator seed for each user. For example, the AP station may define the generator seed in an EDMG-Header-B, e.g., in the first 7 bits.

In some demonstrative embodiments, as shown in FIG. 5, transmitter architecture 500 may include a plurality of processing modules 530 configured to process the respective plurality of PSDUs 501 to be transmitted to the respective plurality of users.

In some demonstrative embodiments, as shown in FIG. 5, a processing module 530 of the plurality of processing modules 530 may be configured to process a respective PSDU 501 of the plurality of PSDUs 501.

In some demonstrative embodiments, the plurality of processing modules 530 may include no more than 16 processing modules, e.g., to process a MU transmission to be transmitted to up to 16 users. In other embodiments, the plurality of processing modules 530 may include any other number of processing modules to process a MU transmission to any other number of users.

In some demonstrative embodiments, a processing module 530 may be configured to encode and modulate a respective PSDU 501, e.g., as described below. For example, PSDU 501 may include a serial stream of PSDU bits, e.g., representing a PSDU of a frame to be transmitted to a respective user in the MU transmission.

In some demonstrative embodiments, as shown in FIG. 5, a processing module 530 may include a spatial stream parser 506 configured to distribute encoded bits 505 of PSDU 501 to a plurality of spatial streams 507, e.g., including $N_{SS}$ spatial streams. For example, encoded bits 505 may be generated by an encoder 504, based on a suitable encoding scheme, for example, an LDPC encoding and/or any other encoding, e.g., as described below.

In some demonstrative embodiments, as shown in FIG. 5, processing module 530 may include a scrambler 502 configured to scramble bits of the PSDU 501.

In some demonstrative embodiments, scrambler 502 may implement a scrambling scheme, for example, in compliance with of an *IEEE* 802.11*ad Specification*.

In some demonstrative embodiments, scrambler 502 may be configured to apply Codeword (CW) padding, for example, by padding the PSDU 501 at an input of encoder 504 with $N_{DATA\_PAD}$ bits, for example, to have an integer number of LDPC codewords, e.g., in accordance with a CW padding of an *IEEE* 802.11*ad Specification*.

In some demonstrative embodiments, as shown in FIG. 5, encoder 504 may include an LDPC encoder ("LDPC core") to encode the PSDU 501 into the encoded bits 505, for example, according to an LDPC code.

In some demonstrative embodiments, encoder 504 may be configured to encode the PSDU into an LDPC CW including a short CW or a long CW, e.g., as decried below.

In some demonstrative embodiments, the short CW may include 672 or 624 bits, and/or the long CW may include 1344 or 1248 bits. In other embodiments, the short CW and/or the long CW may include any other number of bits.

In some demonstrative embodiments, encoder 504 may be configured to implement a SC block padding scheme to pad bits of the PSDU. For example, encoded bits at the output of encoder 504 may be padded with $N_{BLK\_PAD}$ bits, e.g., to have an integer number of SC symbol blocks.

In some demonstrative embodiments, spatial stream parser 506 may be configured to distribute the encoded bits to the plurality of spatial streams 507, for example, based on a round robin mechanism.

In one example, spatial stream parser 506 may be configured to perform spatial stream parsing. For example, a flow of sequential bits 505 may be equally distributed between the plurality of spatial streams 507, for example, in a round robin manner and/or according to any other parsing/distribution scheme, e.g., on a bit basis.

In some demonstrative embodiments, the plurality of spatial streams 507 may have a same MCS.

In some demonstrative embodiments, the plurality of spatial streams 507 may include no more than 4 spatial streams. In other embodiments, the plurality of spatial streams 507 may include 2 spatial streams, 8 spatial streams, or any other number of spatial streams.

In some demonstrative embodiments, the plurality of processing modules 530 may be configured to process a total number of no more than 16 spatial streams. In other embodiments, any other total number of spatial streams may be processed by all of the plurality of processing modules 530.

In some demonstrative embodiments, as shown in FIG. 5, processing module 530 may include a plurality of constellation mappers 508 configured to map encoded bits of the plurality of spatial streams 507 into a respective plurality of streams of constellation symbols 509, for example, according to a constellation scheme implemented by transmitter 118 (FIG. 1).

In some demonstrative embodiments, as shown in FIG. 5, processing module 530 may include a plurality of interleavers 510 configured to interleave symbols of respective ones of the plurality of streams of constellation symbols 509.

In some demonstrative embodiments, an interleaver 510 corresponding to a stream of the plurality of streams of constellation symbols 509, may be configured to interleave, e.g., on a symbol basis, symbols of an SC symbol block of the stream of constellation symbols.

In one example, an interleaver 510 may apply an interleaving configured for 64QAM and/or 256QAM modulations, and/or any other modulation.

In some demonstrative embodiments, as shown in FIG. 5, processing module 530 may include an STBC encoder 512 to encode the plurality of streams of constellation symbols 509 into SC symbol blocks over a plurality of space-time streams 513.

In some demonstrative embodiments, STBC encoder 512 may be configured to perform an SC symbol blocking and/or a space-time block coding, e.g., according to an STBC scheme.

In some demonstrative embodiments, a count of the plurality of space-time streams 513 may be based on a type of the STBC scheme.

In some demonstrative embodiments, the count of the plurality of space-time streams 513 may be a multiple of a count of the plurality of spatial streams 507.

In one example, the count of the plurality of space-time streams 513 may double the count of the plurality of spatial streams 507, for example, if the STBC scheme includes a 2×1 scheme, which utilizes two space-time steams two encode each spatial stream.

In some demonstrative embodiments, a count of the plurality of space-time streams 513 may include no more than 8 space-time streams. In other embodiments, the count of the plurality of space-time streams 513 may include any other number of streams.

In some demonstrative embodiments, as shown in FIG. 5, processing module 530 may include a plurality of GI inserters 514 configured to insert GI sequences to the SC symbol blocks, for example, over the plurality of space-time streams 513.

In some demonstrative embodiments, the GI sequences may have a GI length of 32, 64, or 128 samples. In other embodiments, the GI sequences may have a GI length of any other number of samples.

In some demonstrative embodiments, a GI inserter 514 may be configured to prepend each SC symbol block with a GI sequence, and/or to add an extra GI at the end of a data part of a frame.

In some demonstrative embodiments, as shown in FIG. 5, transmitter architecture 500 may include a transmit beamforming module 516 ("TxBF"), which may be configured to map outputs 515 of the plurality of processing modules 530, e.g., including the plurality of streams 514 from the plurality of processing modules 530, to a plurality of transmit chains 517. For example, transmit chains 517 may include a plurality of transmit chains of RF chains 109 (FIG. 1).

In some demonstrative embodiments, transmitter architecture 500 may be configured to combine different space-time streams from processing modules 530, for example, at transmit beamforming module 516. For example, a wideband precoding matrix V may be applied in a time domain, for example, to the EDMG-CEF-STF/EDMG-CEF, PSDU, and possibly to AGC/TRN units.

In some demonstrative embodiments, transmitter architecture 500 may be configured to transmit a MU SC transmission based on PSDUs 501, e.g., to a plurality of users including device 104 (FIG. 1).

In some demonstrative embodiments, transmitter architecture 500 may be configured to transmit the MU SC transmission over a bonded channel and/or an aggregated channel including a plurality of channels.

In one example, transmitter architecture 500 may be configured to apply an output waveform for the MU SC transmission. For example, the waveform may be defined at an $N_{CB}*1.76$ GHz chip rate, wherein $N_{CB}$ denotes a bonding factor, e.g., a bonding factor equal to 1, 2, 3, or 4, or any other bonding factor.

In some demonstrative embodiments, transmitter architecture 500 may be configured to transmit the MU SC transmission via the plurality of transmit chains 517 over a Directional Multi-Gigabit (DMG) band.

In some demonstrative embodiments, as shown in FIG. 5, transmitter architecture 500 may include a plurality of pulse shaping filters 518 configured to filter the SC transmission over the plurality of transmit chains.

In some demonstrative embodiments, as shown in FIG. 5, transmitter architecture 500 may include a plurality of Digital to Analog (DAC) convertors, and/or RF processing modules 520, configured to convert the SC transmission from digital to analog, and/or to perform RF processing of the SC transmission.

In some demonstrative embodiments, transmitter architecture 500 may include one or more other components, elements, and/or modules configured to process and/or to transmit the MU SC transmission.

Referring back to FIG. 1, in some demonstrative embodiments, devices 102 and/or 140 may implement a MU transmitter architecture configured to process the MU transmission for SC PHY according to a second option, e.g., as described below.

In some demonstrative embodiments, the MU transmitter architecture according to the second option may not utilize interleaves, e.g., the plurality of interleaves 510 (FIG. 5).

Figure 6:
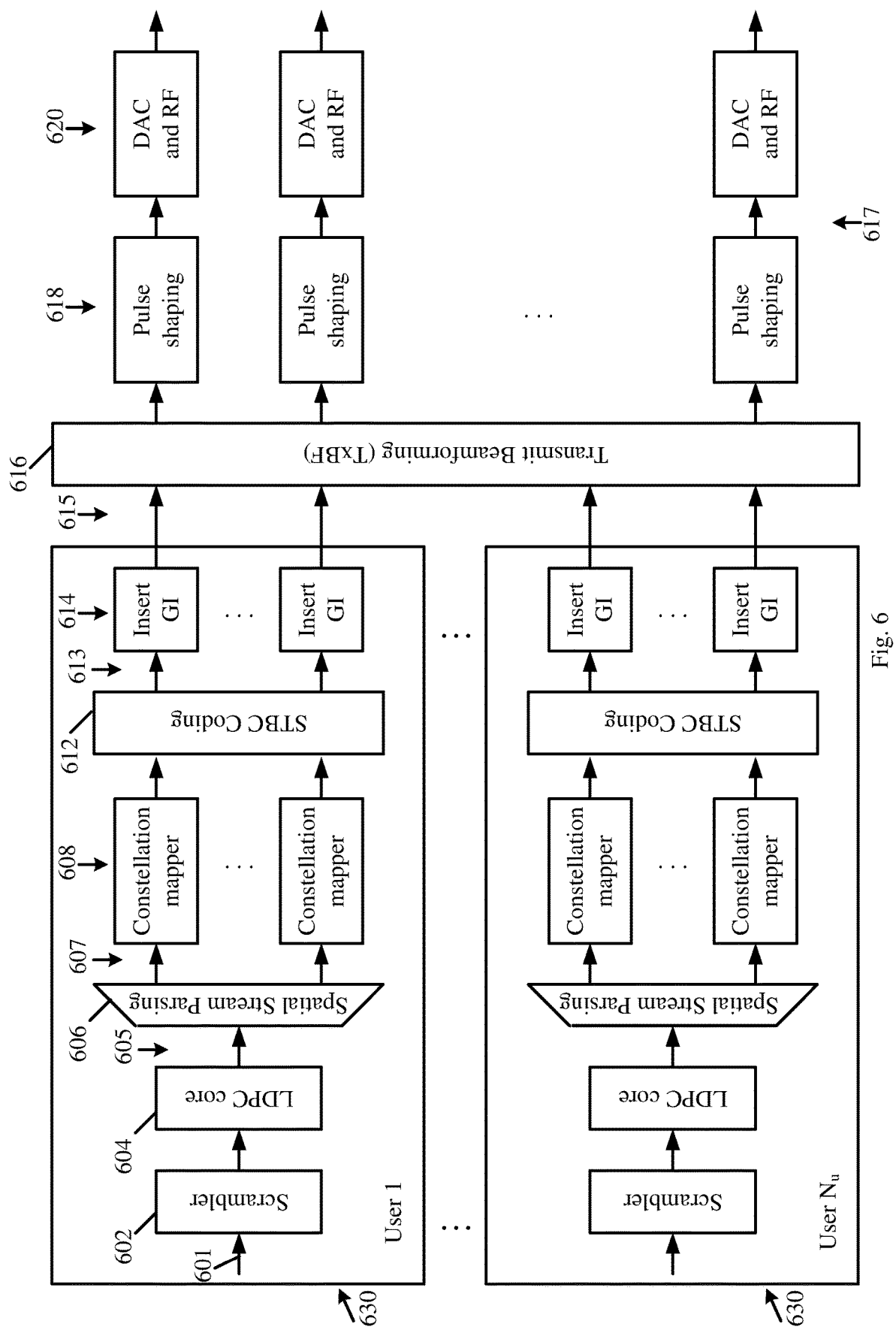
FIG. 6 is a schematic illustration of a MU transmitter architecture, in accordance with some demonstrative embodiments.

Reference is made to FIG. 6, which schematically illustrates a MU transmitter architecture 600, in accordance with some demonstrative embodiments. In one example, transmitter 118 (FIG. 1) and/or transmitter 148 (FIG. 1) may be implemented according to, and/or may include one or more elements of, MU transmitter architecture 600.

In some demonstrative embodiments, MU transmitter architecture 600 may be configured to encode and modulate a plurality of PSDUs 601 to be transmitted to a plurality of respective users, e.g., as described below. For example, a PSDU 601 may include a serial stream of PSDU bits, e.g., representing a PSDU of a frame to be transmitted to a user in a MU transmission. In one example, transmitter 118 (FIG. 1) may process PSDUs 601 of a MU transmission to a plurality of users, e.g., including device 140 (FIG. 1).

In some demonstrative embodiments, MU transmitter architecture 600 may be configured to encode and modulate the plurality of PSDUs 601, e.g., as described below.

In some demonstrative embodiments, MU transmitter architecture 600 may be configured to perform PSDU encoding and modulation, for example, independently for each user, e.g., as described above with reference to the SU transmitter 300 (FIG. 3).

In one example, an MU transmitter architecture 600 of an Access Point (AP) station may be configured to use its own random generator seed for each user. For example, the AP station may define the generator seed in an EDMG-Header-B, e.g., in the first 7 bits.

In some demonstrative embodiments, as shown in FIG. 6, transmitter architecture 600 may include a plurality of processing modules 630 configured to process the respective plurality of PSDUs 601 to be transmitted to the respective plurality of users.

In some demonstrative embodiments, as shown in FIG. 6, a processing module 630 of the plurality of processing modules 630 may be configured to process a respective PSDU 601 of the plurality of PSDUs 601.

In some demonstrative embodiments, the plurality of processing modules 630 may include no more than 16 processing modules, e.g., to process a MU transmission to be transmitted to up to 16 users. In other embodiments, the plurality of processing modules 630 may include any other number of processing modules to process a MU transmission to any other number of users.

In some demonstrative embodiments, a processing module 630 may be configured to encode and modulate a respective PSDU 601, e.g., as described below. For example, PSDU 601 may include a serial stream of PSDU bits, e.g., representing a PSDU of a frame to be transmitted to a respective user in the MU transmission.

In some demonstrative embodiments, as shown in FIG. 6, a processing module 630 may include a spatial stream parser 606 configured to distribute encoded bits 605 of PSDU 601 to a plurality of spatial streams 607, e.g., including $N_{SS}$ spatial streams. For example, encoded bits 605 may be generated by an encoder 604, based on a suitable encoding scheme, for example, an LDPC encoding and/or any other encoding, e.g., as described below.

In some demonstrative embodiments, as shown in FIG. 6, processing module 630 may include a scrambler 602 configured to scramble bits of the PSDU 601.

In some demonstrative embodiments, scrambler 602 may implement a scrambling scheme, for example, in compliance with of an *IEEE* 802.11*ad Specification*.

In some demonstrative embodiments, scrambler 602 may be configured to apply Codeword (CW) padding, for example, by padding the PSDU 601 at an input of encoder 604 with $N_{DATA\_PAD}$ bits, for example, to have an integer number of LDPC codewords, e.g., in accordance with a CW padding of an *IEEE* 802.11*ad Specification*.

In some demonstrative embodiments, as shown in FIG. 6, encoder 604 may include an LDPC encoder ("LDPC core") to encode the PSDU 601 into the encoded bits 605, for example, according to an LDPC code.

In some demonstrative embodiments, encoder 604 may be configured to encode the PSDU into an LDPC CW including a short CW or a long CW, e.g., as decried below.

In some demonstrative embodiments, the short CW may include 672 or 624 bits, and/or the long CW may include 1344 or 1248 bits. In other embodiments, the short CW and/or the long CW may include any other number of bits.

In some demonstrative embodiments, encoder 604 may be configured to implement a SC block padding scheme to pad bits of the PSDU. For example, encoded bits at the output of encoder 604 may be padded with $N_{BLK\_PAD}$ bits, e.g., to have an integer number of SC symbol blocks.

In some demonstrative embodiments, spatial stream parser 606 may be configured to distribute the encoded bits to the plurality of spatial streams 607, for example, based on a round robin mechanism.

In one example, spatial stream parser 606 may be configured to perform spatial stream parsing. For example, a flow of sequential bits 605 may be equally distributed between the plurality of spatial streams 607, for example, in a round robin manner and/or according to any other parsing/distribution scheme, e.g., on a bit basis.

In some demonstrative embodiments, the plurality of spatial streams 607 may have a same MCS.

In some demonstrative embodiments, the plurality of spatial streams 607 may include no more than 4 spatial streams. In other embodiments, the plurality of spatial streams 607 may include 2 spatial streams, 8 spatial streams, or any other number of spatial streams.

In some demonstrative embodiments, the plurality of processing modules 630 may be configured to process a total number of no more than 16 spatial streams. In other embodiments, any other total number of spatial streams may be processed by all of the plurality of processing modules 630.

In some demonstrative embodiments, as shown in FIG. 6, processing module 630 may include a plurality of constellation mappers 608 configured to map encoded bits of the plurality of spatial streams 607 into a respective plurality of streams of constellation symbols 609, for example, according to a constellation scheme implemented by transmitter 118 (FIG. 1).

In some demonstrative embodiments, as shown in FIG. 6, processing module 630 may include an STBC encoder 612 to encode the plurality of streams of constellation symbols 609 into SC symbol blocks over a plurality of space-time streams 613.

In some demonstrative embodiments, as shown in FIG. 4, one or more of processing modules 630, e.g., each of processing modules 630, may not utilize an interleaving functionality. For example, STBC encoder 612 may process the SC symbol blocks from constellation mapper 608, e.g., without interleaving.

In some demonstrative embodiments, STBC encoder 612 may be configured to perform an SC symbol blocking and/or a space-time block coding, e.g., according to an STBC scheme.

In some demonstrative embodiments, a count of the plurality of space-time streams 613 may be based on a type of the STBC scheme.

In some demonstrative embodiments, the count of the plurality of space-time streams 613 may be a multiple of a count of the plurality of spatial streams 607.

In one example, the count of the plurality of space-time streams 613 may double the count of the plurality of spatial streams 607, for example, if the STBC scheme includes a 2×1 scheme, which utilizes two space-time steams two encode each spatial stream.

In some demonstrative embodiments, a count of the plurality of space-time streams 613 may include no more than 8 space-time streams. In other embodiments, the count of the plurality of space-time streams 613 may include any other number of streams.

In some demonstrative embodiments, as shown in FIG. 6, processing module 630 may include a plurality of GI inserters 614 configured to insert GI sequences to the SC symbol blocks, for example, over the plurality of space-time streams 613.

In some demonstrative embodiments, the GI sequences may have a GI length of 32, 64, or 128 samples. In other embodiments, the GI sequences may have a GI length of any other number of samples.

In some demonstrative embodiments, a GI inserter 614 may be configured to prepend each SC symbol block with a GI sequence, and/or to add an extra GI at the end of a data part of a frame.

In some demonstrative embodiments, as shown in FIG. 6, transmitter architecture 600 may include a transmit beamforming module 616 ("TxBF"), which may be configured to map outputs 615 of the plurality of processing modules 630, e.g., including the plurality of streams 614 from the plurality of processing modules 630, to a plurality of transmit chains 617. For example, transmit chains 617 may include a plurality of transmit chains of RF chains 109 (FIG. 1).

In some demonstrative embodiments, transmitter architecture 600 may be configured to combine different space-time streams from processing modules 630, for example, at transmit beamforming module 616. For example, a wideband precoding matrix V may be applied in a time domain, for example, to the EDMG-CEF-STF/EDMG-CEF, PSDU, and possibly to AGC/TRN units.

In some demonstrative embodiments, transmitter architecture 600 may be configured to transmit a MU SC transmission based on PSDUs 601, e.g., to a plurality of users including device 104 (FIG. 1).

In some demonstrative embodiments, transmitter architecture 600 may be configured to transmit the MU SC transmission over a bonded channel and/or an aggregated channel including a plurality of channels.

In one example, transmitter architecture 600 may be configured to apply an output waveform for the MU SC transmission. For example, the waveform may be defined at an $N_{CB}*1.76$ GHz chip rate, wherein $N_{CB}$ denotes a bonding factor, e.g., a bonding factor equal to 1, 2, 3, or 4, or any other bonding factor.

In some demonstrative embodiments, transmitter architecture 600 may be configured to transmit the MU SC transmission via the plurality of transmit chains 617 over a Directional Multi-Gigabit (DMG) band.

In some demonstrative embodiments, as shown in FIG. 6, transmitter architecture 600 may include a plurality of pulse shaping filters 618 configured to filter the SC transmission over the plurality of transmit chains.

In some demonstrative embodiments, as shown in FIG. 6, transmitter architecture 600 may include a plurality of Digital to Analog (DAC) convertors, and/or RF processing modules 620, configured to convert the SC transmission from digital to analog, and/or to perform RF processing of the SC transmission.

In some demonstrative embodiments, transmitter architecture 600 may include one or more other components, elements, and/or modules configured to process and/or to transmit the MU SC transmission.

Figure 7:
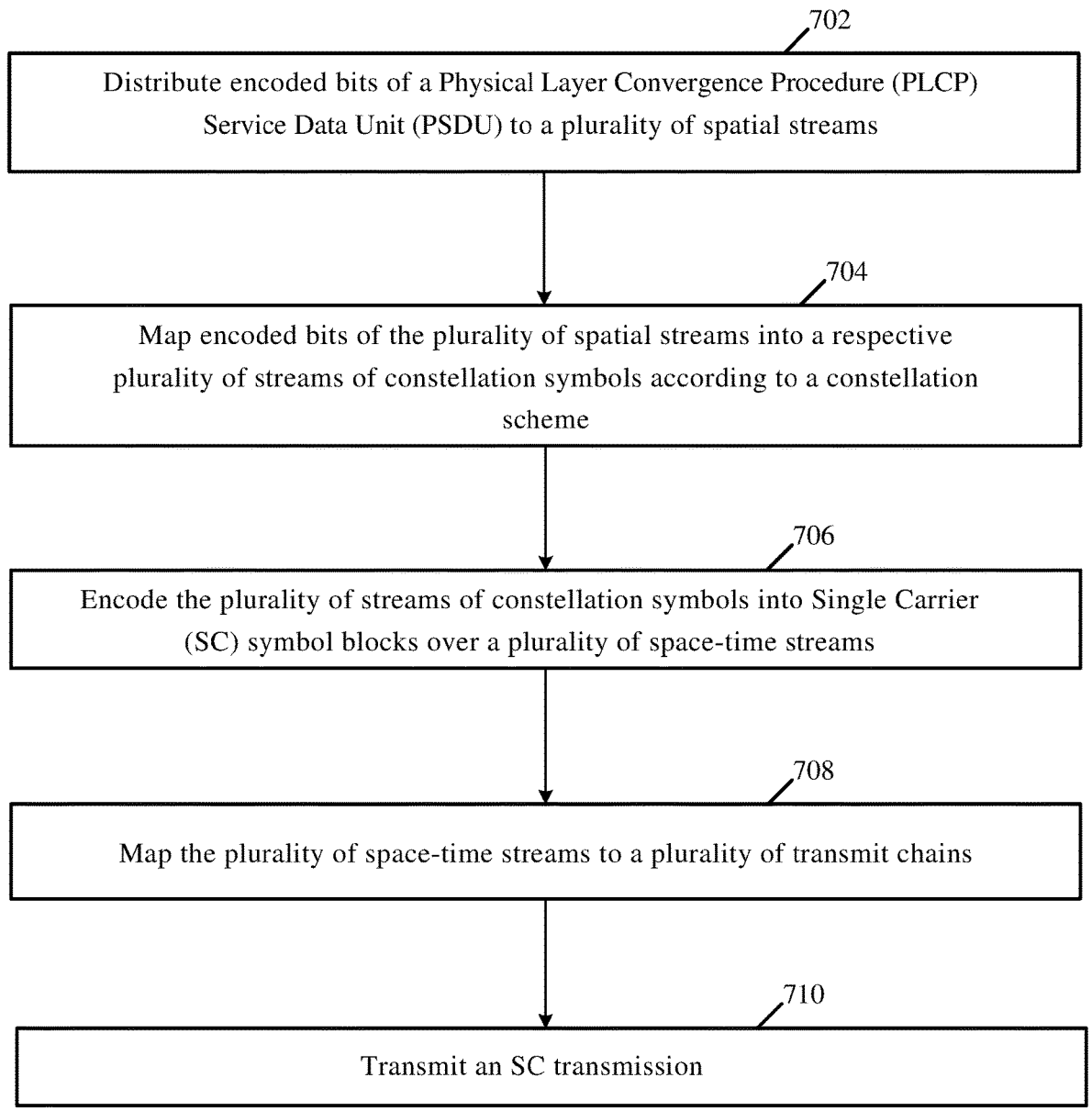
FIG. 7 is a schematic flow-chart illustration of a method of transmitting A Single Carrier (SC) transmission, in accordance with some demonstrative embodiments.

Reference is made to FIG. 7, which schematically illustrates a method of transmitting a SC transmission, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver, e.g., receiver 116 (FIG. 1), and/or receiver 146 (FIG. 1); and/or a message processor, e.g., message processor 128 (FIG. 1), and/or message processor 158 (FIG. 1).

As indicated at block 702, the method may include distributing encoded bits of a PSDU to a plurality of spatial streams. For example, spatial stream parser 306 (FIG. 3) may distribute encoded bits of PSDU 301 (FIG. 3) to a plurality of spatial streams 307 (FIG. 3); spatial stream parser 406 (FIG. 4) may distribute encoded bits of PSDU 401 (FIG. 4) to a plurality of spatial streams 407 (FIG. 4); spatial stream parser 506 (FIG. 5) may distribute encoded bits of PSDU 501 (FIG. 5) to a plurality of spatial streams 507 (FIG. 5); and/or spatial stream parser 606 (FIG. 6) may distribute encoded bits of PSDU 601 (FIG. 6) to a plurality of spatial streams 607 (FIG. 6), e.g., as described above.

As indicated at block 704, the method may include mapping encoded bits of the plurality of spatial streams into a respective plurality of streams of constellation symbols according to a constellation scheme. For example, the plurality of constellation mappers 308 (FIG. 3) may map the encoded bits of the plurality of spatial streams 307 (FIG. 3) into a respective plurality of streams of constellation symbols 309 (FIG. 3) according to the constellation scheme; the plurality of constellation mappers 408 (FIG. 4) may map the encoded bits of the plurality of spatial streams 407 (FIG. 4) into a respective plurality of streams of constellation symbols 409 (FIG. 4) according to the constellation scheme; the plurality of constellation mappers 508 (FIG. 5) may map the encoded bits of the plurality of spatial streams 507 (FIG. 5) into a respective plurality of streams of constellation symbols 509 (FIG. 5) according to the constellation scheme; and/or the plurality of constellation mappers 608 (FIG. 6) may map the encoded bits of the plurality of spatial streams 607 (FIG. 6) into a respective plurality of streams of constellation symbols 609 (FIG. 6) according to the constellation scheme, e.g., as described above.

As indicated at block 706, the method may include encoding the plurality of streams of constellation symbols into SC symbol blocks over a plurality of space-time streams. For example, STBC encoder 312 (FIG. 3) may encode the plurality of streams of constellation symbols 309 (FIG. 3) into the SC symbol blocks over the plurality of space-time streams 313 (FIG. 3); STBC encoder 412 may encode the plurality of streams of constellation symbols 409 (FIG. 4) into the SC symbol blocks over the plurality of space-time streams 413 (FIG. 4); STBC encoder 512 (FIG. 5) may encode the plurality of streams of constellation symbols 509 (FIG. 5) into the SC symbol blocks over the plurality of space-time streams 513 (FIG. 5); and/or STBC encoder 612 (FIG. 6) may encode the plurality of streams of constellation symbols 609 (FIG. 6) into the SC symbol blocks over the plurality of space-time streams 613 (FIG. 6), e.g., as described above.

As indicated at block 708, the method may include mapping the plurality of space-time streams to a plurality of transmit chains. For example, transmit beamforming module 316 (FIG. 3) may map the plurality of space-time streams 313 (FIG. 3) to the plurality of transmit chains 317 (FIG. 3), transmit beamforming module 416 (FIG. 4) may map the plurality of space-time streams 413 (FIG. 4) to the plurality of transmit chains 417 (FIG. 4); transmit beamforming module 516 (FIG. 5) may map the plurality of space-time streams 513 (FIG. 5) from the plurality of processing modules 530 (FIG. 5) to the plurality of transmit chains 517 (FIG. 5); and/or transmit beamforming module 616 (FIG. 6) may map the plurality of space-time streams 613 (FIG. 6) from the plurality of processing modules 630 (FIG. 6) to the plurality of transmit chains 617 (FIG. 6), e.g., as described above.

As indicated at block 710, the method may include transmitting a SC transmission over a directional communication band, for example, based on the plurality of space-time streams. For example, transmitter 118 (FIG. 1) may transmit a SU SC transmission or a MU SC transmission over a DMG band, e.g., as described above.

Figure 8:
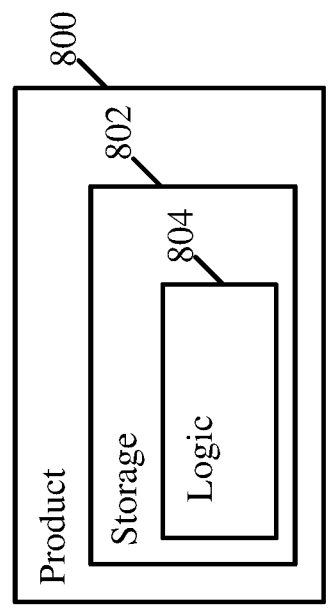
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include one or more tangible computer-readable non-transitory storage media 802, which may include computer-executable instructions, e.g., implemented by logic 804, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), 1), receiver 146 (FIG. 1), controller 124 (FIG. 1), controller 154 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), 1), receiver 146 (FIG. 1), controller 124 (FIG. 1), controller 154 (FIG. 1), message processor 128 (FIG. 1), and/or message processor 158 (FIG. 1), to perform one or more operations, and/or to perform, trigger and/or implement one or more operations, communications and/or functionalities described above with reference to FIGS. 1, 2, 3, 4, 5, 6, and/or 7, and/or one or more operations described herein. The phrase "non-transitory machine-readable medium" is directed to include all computer-readable media, with the sole exception being a transitory propagating signal.

In some demonstrative embodiments, product 800 and/or storage media 802 may include one or more types of computer-readable storage media capable of storing data, including volatile memory, non-volatile memory, removable or non-removable memory, erasable or non-erasable memory, writeable or re-writeable memory, and the like. For example, machine-readable storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of a Single User (SU) Single Carrier (SC) Physical Layer (PHY) transmitter, the apparatus comprising a spatial stream parser to distribute encoded bits of a Physical Layer Convergence Procedure (PLCP) Service Data Unit (PSDU) to a plurality of spatial streams; a plurality of constellation mappers to map encoded bits of the plurality of spatial streams into a respective plurality of streams of constellation symbols according to a constellation scheme; a Space Time Block Code (STBC) encoder to encode the plurality of streams of constellation symbols into SC symbol blocks over a plurality of space-time streams; and a transmit beamforming module to map the plurality of space-time streams to a plurality of transmit chains.

Example 2 includes the subject matter of Example 1, and optionally, comprising an encoder to generate the encoded bits of the PSDU according to a low-density parity-check (LDPC) code.

Example 3 includes the subject matter of Example 2, and optionally, wherein the encoder is to encode the PSDU into an LDPC codeword (CW) comprising a short CW or a long CW, the short CW comprising 672 or 624 bits, and the long CW comprising 1344 or 1248 bits.

Example 4 includes the subject matter of any one of Examples 1-3, and optionally, comprising a plurality of Guard Interval (GI) inserters to insert GI sequences to the SC symbol blocks over the plurality of space-time streams.

Example 5 includes the subject matter of Example 4, and optionally, wherein a GI of the GI sequences has a GI length of 32, 64 or 128 samples.

Example 6 includes the subject matter of any one of Examples 1-5, and optionally, comprising a plurality of interleavers to interleave symbols of respective ones of the plurality of streams of constellation symbols, an interleaver corresponding to a stream of the plurality of streams to interleave, on a symbol basis, symbols of an SC symbol block of the stream of constellation symbols.

Example 7 includes the subject matter of any one of Examples 1-6, and optionally, wherein the plurality of spatial streams have a same Modulation and Coding Scheme (MCS).

Example 8 includes the subject matter of any one of Examples 1-7, and optionally, wherein the apparatus is configured to transmit an SC transmission over a bonded or an aggregated channel comprising a plurality of channels.

Example 9 includes the subject matter of any one of Examples 1-8, and optionally, wherein the spatial stream parser is to distribute the encoded bits of the PSDU to the plurality of spatial streams based on a round robin mechanism.

Example 10 includes the subject matter of any one of Examples 1-9, and optionally, wherein the plurality of spatial streams comprises no more than 8 spatial streams.

Example 11 includes the subject matter of any one of Examples 1-10, and optionally, wherein a count of the plurality of space-time streams is double a count of the plurality of spatial streams.

Example 12 includes the subject matter of any one of Examples 1-11, and optionally, wherein the plurality of space-time streams comprises no more than 8 space-time streams.

Example 13 includes the subject matter of any one of Examples 1-12, and optionally, wherein the apparatus is configured to transmit a SC transmission via the plurality of transmit chains over a Directional Multi-Gigabit (DMG) band.

Example 14 includes the subject matter of any one of Examples 1-13, and optionally, comprising one or more antennas, a memory, and a processor.

Example 15 includes a system of wireless communication comprising a wireless station, the wireless station comprising one or more antennas; a memory; a processor; and a Single User (SU) Single Carrier (SC) Physical Layer (PHY) transmitter comprising a spatial stream parser to distribute encoded bits of a Physical Layer Convergence Procedure (PLCP) Service Data Unit (PSDU) to a plurality of spatial streams; a plurality of constellation mappers to map encoded bits of the plurality of spatial streams into a respective plurality of streams of constellation symbols according to a constellation scheme; a Space Time Block Code (STBC) encoder to encode the plurality of streams of constellation symbols into SC symbol blocks over a plurality of space-time streams; and a transmit beamforming module to map the plurality of space-time streams to a plurality of transmit chains.

Example 16 includes the subject matter of Example 15, and optionally, wherein the transmitter comprises an encoder to generate the encoded bits of the PSDU according to a low-density parity-check (LDPC) code.

Example 17 includes the subject matter of Example 16, and optionally, wherein the encoder is to encode the PSDU into an LDPC codeword (CW) comprising a short CW or a long CW, the short CW comprising 672 or 624 bits, and the long CW comprising 1344 or 1248 bits.

Example 18 includes the subject matter of any one of Examples 15-17, and optionally, wherein the transmitter comprises a plurality of Guard Interval (GI) inserters to insert GI sequences to the SC symbol blocks over the plurality of space-time streams.

Example 19 includes the subject matter of Example 18, and optionally, wherein a GI of the GI sequences has a GI length of 32, 64 or 128 samples.

Example 20 includes the subject matter of any one of Examples 15-19, and optionally, wherein the transmitter comprises a plurality of interleavers to interleave symbols of respective ones of the plurality of streams of constellation symbols, an interleaver corresponding to a stream of the plurality of streams to interleave, on a symbol basis, symbols of an SC symbol block of the stream of constellation symbols.

Example 21 includes the subject matter of any one of Examples 15-20, and optionally, wherein the plurality of spatial streams have a same Modulation and Coding Scheme (MCS).

Example 22 includes the subject matter of any one of Examples 15-21, and optionally, wherein the transmitter is configured to transmit an SC transmission over a bonded or an aggregated channel comprising a plurality of channels.

Example 23 includes the subject matter of any one of Examples 15-22, and optionally, wherein the spatial stream parser is to distribute the encoded bits of the PSDU to the plurality of spatial streams based on a round robin mechanism.

Example 24 includes the subject matter of any one of Examples 15-23, and optionally, wherein the plurality of spatial streams comprises no more than 8 spatial streams.

Example 25 includes the subject matter of any one of Examples 15-24, and optionally, wherein a count of the plurality of space-time streams is double a count of the plurality of spatial streams.

Example 26 includes the subject matter of any one of Examples 15-25, and optionally, wherein the plurality of space-time streams comprises no more than 8 space-time streams.

Example 27 includes the subject matter of any one of Examples 15-26, and optionally, wherein the transmitter is configured to transmit a SC transmission via the plurality of transmit chains over a Directional Multi-Gigabit (DMG) band.

Example 28 includes a method to be performed at a transmitter of a wireless station, the method comprising distributing encoded bits of a Physical Layer Convergence Procedure (PLCP) Service Data Unit (PSDU) to a plurality of spatial streams; mapping encoded bits of the plurality of spatial streams into a respective plurality of streams of constellation symbols according to a constellation scheme; encoding the plurality of streams of constellation symbols into Single Carrier (SC) symbol blocks over a plurality of space-time streams; and mapping the plurality of space-time streams to a plurality of transmit chains.

Example 29 includes the subject matter of Example 28, and optionally, comprising generating the encoded bits of the PSDU according to a low-density parity-check (LDPC) code.

Example 30 includes the subject matter of Example 29, and optionally, comprising encoding the PSDU into an LDPC codeword (CW) comprising a short CW or a long CW, the short CW comprising 672 or 624 bits, and the long CW comprising 1344 or 1248 bits.

Example 31 includes the subject matter of any one of Examples 28-30, and optionally, comprising inserting a plurality of Guard Interval (GI) sequences to the SC symbol blocks over the plurality of space-time streams.

Example 32 includes the subject matter of Example 31, and optionally, wherein a GI of the GI sequences has a GI length of 32, 64 or 128 samples.

Example 33 includes the subject matter of any one of Examples 28-32, and optionally, comprising performing a plurality of interleaving operations to interleave symbols of respective ones of the plurality of streams of constellation symbols, an interleaving operation corresponding to a stream of the plurality of streams to interleave, on a symbol basis, symbols of an SC symbol block of the stream of constellation symbols.

Example 34 includes the subject matter of any one of Examples 28-33, and optionally, wherein the plurality of spatial streams have a same Modulation and Coding Scheme (MCS).

Example 35 includes the subject matter of any one of Examples 28-34, and optionally, comprising transmitting an SC transmission over a bonded or an aggregated channel comprising a plurality of channels.

Example 36 includes the subject matter of any one of Examples 28-35, and optionally, comprising distributing the encoded bits of the PSDU to the plurality of spatial streams based on a round robin mechanism.

Example 37 includes the subject matter of any one of Examples 28-36, and optionally, wherein the plurality of spatial streams comprises no more than 8 spatial streams.

Example 38 includes the subject matter of any one of Examples 28-37, and optionally, wherein a count of the plurality of space-time streams is double a count of the plurality of spatial streams.

Example 39 includes the subject matter of any one of Examples 28-38, and optionally, wherein the plurality of space-time streams comprises no more than 8 space-time streams.

Example 40 includes the subject matter of any one of Examples 28-39, and optionally, comprising transmitting a SC transmission via the plurality of transmit chains over a Directional Multi-Gigabit (DMG) band.

Example 41 includes a product comprising one or more tangible computer-readable non-transitory storage media comprising computer-executable instructions operable to, when executed by at least one computer processor, enable the at least one computer processor to cause a transmitter of a wireless station to distribute encoded bits of a Physical Layer Convergence Procedure (PLCP) Service Data Unit (PSDU) to a plurality of spatial streams; map encoded bits of the plurality of spatial streams into a respective plurality of streams of constellation symbols according to a constellation scheme; encode the plurality of streams of constellation symbols into Single Carrier (SC) symbol blocks over a plurality of space-time streams; and map the plurality of space-time streams to a plurality of transmit chains.

Example 42 includes the subject matter of Example 41, and optionally, wherein the instructions, when executed, cause the transmitter to generate the encoded bits of the PSDU according to a low-density parity-check (LDPC) code.

Example 43 includes the subject matter of Example 42, and optionally, wherein the instructions, when executed, cause the transmitter to encode the PSDU into an LDPC codeword (CW) comprising a short CW or a long CW, the short CW comprising 672 or 624 bits, and the long CW comprising 1344 or 1248 bits.

Example 44 includes the subject matter of any one of Examples 41-43, and optionally, wherein the instructions, when executed, cause the transmitter to insert Guard Interval (GI) sequences to the SC symbol blocks over the plurality of space-time streams.

Example 45 includes the subject matter of Example 44, and optionally, wherein a GI of the GI sequences has a GI length of 32, 64 or 128 samples.

Example 46 includes the subject matter of any one of Examples 41-45, and optionally, wherein the instructions, when executed, cause the transmitter to perform a plurality of interleaving operations to interleave symbols of respective ones of the plurality of streams of constellation symbols, an interleaving operation corresponding to a stream of the plurality of streams to interleave, on a symbol basis, symbols of an SC symbol block of the stream of constellation symbols.

Example 47 includes the subject matter of any one of Examples 41-46, and optionally, wherein the plurality of spatial streams have a same Modulation and Coding Scheme (MCS).

Example 48 includes the subject matter of any one of Examples 41-47, and optionally, wherein the instructions, when executed, cause the transmitter to transmit an SC transmission over a bonded or an aggregated channel comprising a plurality of channels.

Example 49 includes the subject matter of any one of Examples 41-48, and optionally, wherein the instructions, when executed, cause the transmitter to distribute the encoded bits of the PSDU to the plurality of spatial streams based on a round robin mechanism.

Example 50 includes the subject matter of any one of Examples 41-49, and optionally, wherein the plurality of spatial streams comprises no more than 8 spatial streams.

Example 51 includes the subject matter of any one of Examples 41-50, and optionally, wherein a count of the plurality of space-time streams is double a count of the plurality of spatial streams.

Example 52 includes the subject matter of any one of Examples 41-51, and optionally, wherein the plurality of space-time streams comprises no more than 8 space-time streams.

Example 53 includes the subject matter of any one of Examples 41-52, and optionally, wherein the instructions, when executed, cause the transmitter to transmit a SC transmission via the plurality of transmit chains over a Directional Multi-Gigabit (DMG) band.

Example 54 includes an apparatus of wireless communication by a transmitter, the apparatus comprising means for distributing encoded bits of a Physical Layer Convergence Procedure (PLCP) Service Data Unit (PSDU) to a plurality of spatial streams; means for mapping encoded bits of the plurality of spatial streams into a respective plurality of streams of constellation symbols according to a constellation scheme; means for encoding the plurality of streams of constellation symbols into Single Carrier (SC) symbol blocks over a plurality of space-time streams; and means for mapping the plurality of space-time streams to a plurality of transmit chains.

Example 55 includes the subject matter of Example 54, and optionally, comprising means for generating the encoded bits of the PSDU according to a low-density parity-check (LDPC) code.

Example 56 includes the subject matter of Example 55, and optionally, comprising means for encoding the PSDU into an LDPC codeword (CW) comprising a short CW or a long CW, the short CW comprising 672 or 624 bits, and the long CW comprising 1344 or 1248 bits.

Example 57 includes the subject matter of any one of Examples 54-56, and optionally, comprising means for inserting Guard Interval (GI) sequences to the SC symbol blocks over the plurality of space-time streams.

Example 58 includes the subject matter of Example 57, and optionally, wherein a GI of the GI sequences has a GI length of 32, 64 or 128 samples.

Example 59 includes the subject matter of any one of Examples 54-58, and optionally, comprising means for performing a plurality of interleaving operations to interleave symbols of respective ones of the plurality of streams of constellation symbols, an interleaving operation corresponding to a stream of the plurality of streams to interleave, on a symbol basis, symbols of an SC symbol block of the stream of constellation symbols.

Example 60 includes the subject matter of any one of Examples 54-59, and optionally, wherein the plurality of spatial streams have a same Modulation and Coding Scheme (MCS).

Example 61 includes the subject matter of any one of Examples 54-60, and optionally, comprising means for transmitting an SC transmission over a bonded or an aggregated channel comprising a plurality of channels.

Example 62 includes the subject matter of any one of Examples 54-61, and optionally, comprising means for distributing the encoded bits of the PSDU to the plurality of spatial streams based on a round robin mechanism.

Example 63 includes the subject matter of any one of Examples 54-62, and optionally, wherein the plurality of spatial streams comprises no more than 8 spatial streams.

Example 64 includes the subject matter of any one of Examples 54-63, and optionally, wherein a count of the plurality of space-time streams is double a count of the plurality of spatial streams.

Example 65 includes the subject matter of any one of Examples 54-64, and optionally, wherein the plurality of space-time streams comprises no more than 8 space-time streams.

Example 66 includes the subject matter of any one of Examples 54-65, and optionally, comprising means for transmitting a SC transmission via the plurality of transmit chains over a Directional Multi-Gigabit (DMG) band.

Example 67 includes an apparatus of a Multi User (MU) Single Carrier (SC) Physical Layer (PHY) transmitter, the apparatus comprising a plurality of processing modules to process a respective plurality of Physical Layer Convergence Procedure (PLCP) Service Data Units (PSDUs) to be transmitted to a respective plurality of users, a processing module to process a PSDU of the plurality of PSDUs comprising a spatial stream parser to distribute encoded bits of the PSDU to a plurality of spatial streams; a plurality of constellation mappers to map encoded bits of the plurality of spatial streams into a respective plurality of streams of constellation symbols according to a constellation scheme; and a Space Time Block Code (STBC) encoder to encode the plurality of streams of constellation symbols into SC symbol blocks over a plurality of space-time streams; and a transmit beamforming module to map outputs of the plurality of processing modules to a plurality of transmit chains.

Example 68 includes the subject matter of Example 67, and optionally, wherein the processing module comprises an encoder to generate the encoded bits of the PSDU according to a low-density parity-check (LDPC) code.

Example 69 includes the subject matter of Example 68, and optionally, wherein the encoder is to encode the PSDU into an LDPC codeword (CW) comprising a short CW or a long CW, the short CW comprising 672 or 624 bits, and the long CW comprising 1344 or 1248 bits.

Example 70 includes the subject matter of any one of Examples 67-69, and optionally, wherein the processing module comprises a plurality of Guard Interval (GI) inserters to insert GI sequences to the SC symbol blocks over the plurality of space-time streams.

Example 71 includes the subject matter of Example 70, and optionally, wherein a GI of the GI sequences has a GI length of 32, 64 or 128 samples.

Example 72 includes the subject matter of any one of Examples 67-71, and optionally, wherein the processing module comprises a plurality of interleavers to interleave symbols of respective ones of the plurality of streams of constellation symbols, an interleaver corresponding to a stream of the plurality of streams to interleave, on a symbol basis, symbols of an SC symbol block of the stream of constellation symbols.

Example 73 includes the subject matter of any one of Examples 67-72, and optionally, wherein the plurality of spatial streams have a same Modulation and Coding Scheme (MCS).

Example 74 includes the subject matter of any one of Examples 67-73, and optionally, wherein the apparatus is configured to transmit an SC transmission over a bonded or an aggregated channel comprising a plurality of channels.

Example 75 includes the subject matter of any one of Examples 67-74, and optionally, wherein the spatial stream parser is to distribute the encoded bits of the PSDU to the plurality of spatial streams based on a round robin mechanism.

Example 76 includes the subject matter of any one of Examples 67-75, and optionally, wherein the plurality of processing modules comprises no more than 16 processing modules.

Example 77 includes the subject matter of any one of Examples 67-76, and optionally, wherein the plurality of spatial streams comprises no more than four spatial streams.

Example 78 includes the subject matter of any one of Examples 67-77, and optionally, wherein a total number of no more than 16 spatial streams are to be processed by all of the plurality of processing modules.

Example 79 includes the subject matter of any one of Examples 67-78, and optionally, wherein a count of the plurality of space-time streams is double a count of the plurality of spatial streams.

Example 80 includes the subject matter of any one of Examples 67-79, and optionally, wherein the plurality of space-time streams comprises no more than 8 space-time streams.

Example 81 includes the subject matter of any one of Examples 67-80, and optionally, wherein the apparatus is configured to transmit an SC transmission via the plurality of transmit chains over a Directional Multi-Gigabit (DMG) band.

Example 82 includes the subject matter of any one of Examples 67-81, and optionally, comprising one or more antennas, a memory, and a processor.

Example 83 includes a system of wireless communication comprising a wireless station, the wireless station comprising one or more antennas; a memory; a processor; and a Multi User (MU) Single Carrier (SC) Physical Layer (PHY) transmitter comprising a plurality of processing modules to process a respective plurality of Physical Layer Convergence Procedure (PLCP) Service Data Units (PSDUs) to be transmitted to a respective plurality of users, a processing module to process a PSDU of the plurality of PSDUs comprising a spatial stream parser to distribute encoded bits of the PSDU to a plurality of spatial streams; a plurality of constellation mappers to map encoded bits of the plurality of spatial streams into a respective plurality of streams of constellation symbols according to a constellation scheme; and a Space Time Block Code (STBC) encoder to encode the plurality of streams of constellation symbols into SC symbol blocks over a plurality of space-time streams; and a transmit beamforming module to map outputs of the plurality of processing modules to a plurality of transmit chains.

Example 84 includes the subject matter of Example 83, and optionally, wherein the processing module comprises an encoder to generate the encoded bits of the PSDU according to a low-density parity-check (LDPC) code.

Example 85 includes the subject matter of Example 84, and optionally, wherein the encoder is to encode the PSDU into an LDPC codeword (CW) comprising a short CW or a long CW, the short CW comprising 672 or 624 bits, and the long CW comprising 1344 or 1248 bits.

Example 86 includes the subject matter of any one of Examples 83-85, and optionally, wherein the processing module comprises a plurality of Guard Interval (GI) inserters to insert GI sequences to the SC symbol blocks over the plurality of space-time streams.

Example 87 includes the subject matter of Example 86, and optionally, wherein a GI of the GI sequences has a GI length of 32, 64 or 128 samples.

Example 88 includes the subject matter of any one of Examples 83-87, and optionally, wherein the processing module comprises a plurality of interleavers to interleave symbols of respective ones of the plurality of streams of constellation symbols, an interleaver corresponding to a stream of the plurality of streams to interleave, on a symbol basis, symbols of an SC symbol block of the stream of constellation symbols.

Example 89 includes the subject matter of any one of Examples 83-88, and optionally, wherein the plurality of spatial streams have a same Modulation and Coding Scheme (MCS).

Example 90 includes the subject matter of any one of Examples 83-89, and optionally, wherein the transmitter is configured to transmit an SC transmission over a bonded or an aggregated channel comprising a plurality of channels.

Example 91 includes the subject matter of any one of Examples 83-90, and optionally, wherein the spatial stream parser is to distribute the encoded bits of the PSDU to the plurality of spatial streams based on a round robin mechanism.

Example 92 includes the subject matter of any one of Examples 83-91, and optionally, wherein the plurality of processing modules comprises no more than 16 processing modules.

Example 93 includes the subject matter of any one of Examples 83-92, and optionally, wherein the plurality of spatial streams comprises no more than four spatial streams.

Example 94 includes the subject matter of any one of Examples 83-93, and optionally, wherein a total number of no more than 16 spatial streams are to be processed by all of the plurality of processing modules.

Example 95 includes the subject matter of any one of Examples 83-94, and optionally, wherein a count of the plurality of space-time streams is double a count of the plurality of spatial streams.

Example 96 includes the subject matter of any one of Examples 83-95, and optionally, wherein the plurality of space-time streams comprises no more than 8 space-time streams.

Example 97 includes the subject matter of any one of Examples 83-96, and optionally, wherein the transmitter is configured to transmit an SC transmission via the plurality of transmit chains over a Directional Multi-Gigabit (DMG) band.

Example 98 includes a method to be performed at a transmitter of a wireless station, the method comprising performing a plurality of processing procedures to process a respective plurality of Physical Layer Convergence Procedure (PLCP) Service Data Units (PSDUs) to be transmitted to a respective plurality of users, performing a processing procedure to process a PSDU of the plurality of PSDUs comprising distributing encoded bits of the PSDU to a plurality of spatial streams; mapping encoded bits of the plurality of spatial streams into a respective plurality of streams of constellation symbols according to a constellation scheme; and encoding the plurality of streams of constellation symbols into SC symbol blocks over a plurality of space-time streams according to a Space Time Block Code (STBC) encoding scheme; and mapping outputs of the plurality of processing procedures to a plurality of transmit chains.

Example 99 includes the subject matter of Example 98, and optionally, wherein performing the processing procedure comprises generating the encoded bits of the PSDU according to a low-density parity-check (LDPC) code.

Example 100 includes the subject matter of Example 99, and optionally, comprising encoding the PSDU into an LDPC codeword (CW) comprising a short CW or a long CW, the short CW comprising 672 or 624 bits, and the long CW comprising 1344 or 1248 bits.

Example 101 includes the subject matter of any one of Examples 98-100, and optionally, wherein performing the processing procedure comprises inserting a plurality of Guard Interval (GI) sequences to the SC symbol blocks over the plurality of space-time streams.

Example 102 includes the subject matter of Example 101, and optionally, wherein a GI of the GI sequences has a GI length of 32, 64 or 128 samples.

Example 103 includes the subject matter of any one of Examples 98-102, and optionally, wherein performing the processing procedure comprises performing a plurality of interleaving operations to interleave symbols of respective ones of the plurality of streams of constellation symbols, an interleaving operation corresponding to a stream of the plurality of streams to interleave, on a symbol basis, symbols of an SC symbol block of the stream of constellation symbols.

Example 104 includes the subject matter of any one of Examples 98-103, and optionally, wherein the plurality of spatial streams have a same Modulation and Coding Scheme (MCS).

Example 105 includes the subject matter of any one of Examples 98-104, and optionally, comprising transmitting an SC transmission over a bonded or an aggregated channel comprising a plurality of channels.

Example 106 includes the subject matter of any one of Examples 98-105, and optionally, comprising distributing the encoded bits of the PSDU to the plurality of spatial streams based on a round robin mechanism.

Example 107 includes the subject matter of any one of Examples 98-106, and optionally, wherein performing the plurality of processing procedures comprises performing no more than 16 processing procedures.

Example 108 includes the subject matter of any one of Examples 98-107, and optionally, wherein the plurality of spatial streams comprises no more than four spatial streams.

Example 109 includes the subject matter of any one of Examples 98-108, and optionally, wherein a total number of no more than 16 spatial streams are to be processed by all of the plurality of processing procedures.

Example 110 includes the subject matter of any one of Examples 98-109, and optionally, wherein a count of the plurality of space-time streams is double a count of the plurality of spatial streams.

Example 111 includes the subject matter of any one of Examples 98-110, and optionally, wherein the plurality of space-time streams comprises no more than 8 space-time streams.

Example 112 includes the subject matter of any one of Examples 98-111, and optionally, comprising transmitting an SC transmission via the plurality of transmit chains over a Directional Multi-Gigabit (DMG) band.

Example 113 includes a product comprising one or more tangible computer-readable non-transitory storage media comprising computer-executable instructions operable to, when executed by at least one computer processor, enable the at least one computer processor to cause a transmitter of a wireless station to perform a plurality of processing procedures to process a respective plurality of Physical Layer Convergence Procedure (PLCP) Service Data Units (PSDUs) to be transmitted to a respective plurality of users, performing a processing procedure to process a PSDU of the plurality of PSDUs comprising distributing encoded bits of the PSDU to a plurality of spatial streams; mapping encoded bits of the plurality of spatial streams into a respective plurality of streams of constellation symbols according to a constellation scheme; and encoding the plurality of streams of constellation symbols into SC symbol blocks over a plurality of space-time streams according to a Space Time Block Code (STBC) encoding scheme; and map outputs of the plurality of processing procedures to a plurality of transmit chains.

Example 114 includes the subject matter of Example 113, and optionally, wherein the instructions, when executed, cause the transmitter to generate the encoded bits of the PSDU according to a low-density parity-check (LDPC) code.

Example 115 includes the subject matter of Example 114, and optionally, wherein the instructions, when executed, cause the transmitter to encode the PSDU into an LDPC codeword (CW) comprising a short CW or a long CW, the short CW comprising 672 or 624 bits, and the long CW comprising 1344 or 1248 bits.

Example 116 includes the subject matter of any one of Examples 113-115, and optionally, wherein the instructions, when executed, cause the transmitter to insert a plurality of Guard Interval (GI) sequences to the SC symbol blocks over the plurality of space-time streams.

Example 117 includes the subject matter of Example 116, and optionally, wherein a GI of the GI sequences has a GI length of 32, 64 or 128 samples.

Example 118 includes the subject matter of any one of Examples 113-117, and optionally, wherein the instructions, when executed, cause the transmitter to perform a plurality of interleaving operations to interleave symbols of respective ones of the plurality of streams of constellation symbols, an interleaving operation corresponding to a stream of the plurality of streams to interleave, on a symbol basis, symbols of an SC symbol block of the stream of constellation symbols.

Example 119 includes the subject matter of any one of Examples 113-118, and optionally, wherein the plurality of spatial streams have a same Modulation and Coding Scheme (MCS).

Example 120 includes the subject matter of any one of Examples 113-119, and optionally, wherein the instructions, when executed, cause the transmitter to transmit an SC transmission over a bonded or an aggregated channel comprising a plurality of channels.

Example 121 includes the subject matter of any one of Examples 113-120, and optionally, wherein the instructions, when executed, cause the transmitter to distribute the encoded bits of the PSDU to the plurality of spatial streams based on a round robin mechanism.

Example 122 includes the subject matter of any one of Examples 113-121, and optionally, wherein the plurality of processing procedures comprises no more than 16 processing procedures.

Example 123 includes the subject matter of any one of Examples 113-122, and optionally, wherein the plurality of spatial streams comprises no more than four spatial streams.

Example 124 includes the subject matter of any one of Examples 113-123, and optionally, wherein a total number of no more than 16 spatial streams are to be processed by all of the plurality of processing procedures.

Example 125 includes the subject matter of any one of Examples 113-124, and optionally, wherein a count of the plurality of space-time streams is double a count of the plurality of spatial streams.

Example 126 includes the subject matter of any one of Examples 113-125, and optionally, wherein the plurality of space-time streams comprises no more than 8 space-time streams.

Example 127 includes the subject matter of any one of Examples 113-126, and optionally, wherein the instructions, when executed, cause the transmitter to transmit an SC transmission via the plurality of transmit chains over a Directional Multi-Gigabit (DMG) band.

Example 128 includes an apparatus of wireless communication by a transmitter of a wireless station, the apparatus comprising means for performing a plurality of processing procedures to process a respective plurality of Physical Layer Convergence Procedure (PLCP) Service Data Units (PSDUs) to be transmitted to a respective plurality of users, performing a processing procedure to process a PSDU of the plurality of PSDUs comprising distributing encoded bits of the PSDU to a plurality of spatial streams; mapping encoded bits of the plurality of spatial streams into a respective plurality of streams of constellation symbols according to a constellation scheme; and encoding the plurality of streams of constellation symbols into SC symbol blocks over a plurality of space-time streams according to a Space Time Block Code (STBC) encoding scheme; and means for mapping outputs of the plurality of processing procedures to a plurality of transmit chains.

Example 129 includes the subject matter of Example 128, and optionally, wherein performing the processing procedure comprises generating the encoded bits of the PSDU according to a low-density parity-check (LDPC) code.

Example 130 includes the subject matter of Example 129, and optionally, comprising means for encoding the PSDU into an LDPC codeword (CW) comprising a short CW or a long CW, the short CW comprising 672 or 624 bits, and the long CW comprising 1344 or 1248 bits.

Example 131 includes the subject matter of any one of Examples 128-130, and optionally, wherein performing the processing procedure comprises inserting a plurality of Guard Interval (GI) sequences to the SC symbol blocks over the plurality of space-time streams.

Example 132 includes the subject matter of Example 131, and optionally, wherein a GI of the GI sequences has a GI length of 32, 64 or 128 samples.

Example 133 includes the subject matter of any one of Examples 128-132, and optionally, wherein performing the processing procedure comprises performing a plurality of interleaving operations to interleave symbols of respective ones of the plurality of streams of constellation symbols, an interleaving operation corresponding to a stream of the plurality of streams to interleave, on a symbol basis, symbols of an SC symbol block of the stream of constellation symbols.

Example 134 includes the subject matter of any one of Examples 128-133, and optionally, wherein the plurality of spatial streams have a same Modulation and Coding Scheme (MCS)

Example 135 includes the subject matter of any one of Examples 128-134, and optionally, comprising means for transmitting an SC transmission over a bonded or an aggregated channel comprising a plurality of channels.

Example 136 includes the subject matter of any one of Examples 128-135, and optionally, comprising means for distributing the encoded bits of the PSDU to the plurality of spatial streams based on a round robin mechanism.

Example 137 includes the subject matter of any one of Examples 128-136, and optionally, wherein performing the plurality of processing procedures comprises performing no more than 16 processing procedures.

Example 138 includes the subject matter of any one of Examples 128-137, and optionally, wherein the plurality of spatial streams comprises no more than four spatial streams.

Example 139 includes the subject matter of any one of Examples 128-138, and optionally, wherein a total number of no more than 16 spatial streams are to be processed by all of the plurality of processing procedures.

Example 140 includes the subject matter of any one of Examples 128-139, and optionally, wherein a count of the plurality of space-time streams is double a count of the plurality of spatial streams.

Example 141 includes the subject matter of any one of Examples 128-140, and optionally, wherein the plurality of space-time streams comprises no more than 8 space-time streams.

Example 142 includes the subject matter of any one of Examples 128-141, and optionally, comprising means for transmitting an SC transmission via the plurality of transmit chains over a Directional Multi-Gigabit (DMG) band.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a Single Carrier (SC) Physical Layer (PHY) transmitter comprising logic and circuitry configured to generate a SC transmission, the SC PHY transmitter comprising:
a Low-Density Parity-Check (LDPC) encoder to encode data of a PHY Service Data Unit (PSDU) into encoded bits according to an LDPC code;
a stream parser to distribute the encoded bits to a plurality of spatial streams;
a plurality of constellation mappers to map the encoded bits in the plurality of spatial streams to constellation symbols in the plurality of spatial streams;
a Space Time Block Code (STBC) encoder to encode the constellation symbols in the plurality of spatial streams into a plurality of space-time streams according to a space-time block code;
a plurality of Guard Interval (GI) inserters to insert GI sequences into the plurality of space-time streams, each GI inserter of the plurality of GI inserters to insert a GI sequence of the GI sequences into a respective space-time stream of the plurality of space-time streams by prepending each SC symbol block of a plurality of SC symbol blocks in the space-time stream with the GI sequence; and
a transmit chain mapper to map the plurality of space-time streams, which comprise the GI sequences, to a plurality of transmit chains.

2. The apparatus of claim 1, wherein the SC PHY transmitter comprises a plurality of interleavers to interleave, on a SC symbol block basis, the constellation symbols in the plurality of spatial streams.

3. The apparatus of claim 2, wherein the plurality of interleavers is configured to interleave the constellation symbols in the plurality of spatial streams according to a 64 Quadrature Amplitude Modulation (QAM) scheme.

4. The apparatus of claim 2, wherein the plurality of interleavers is configured to interleave the constellation symbols in the plurality of spatial streams prior to encoding of the constellation symbols in the plurality of spatial streams into the plurality of space-time streams.

5. The apparatus of claim 1, wherein the LDPC encoder is configured to encode the data of the PSDU into an integer number of codewords and SC symbol blocks.

6. The apparatus of claim 1, wherein the LDPC encoder is configured to encode the data of the PSDU according to a short codeword (CW) length of 672 or 624 bits.

7. The apparatus of claim 1, wherein the LDPC encoder is configured to encode the data of the PSDU according to a long codeword (CW) length of 1344 or 1248 bits.

8. The apparatus of claim 1, wherein the GI sequence has a length of 32, 64 or 128.

9. The apparatus of claim 1, wherein a count of the space-time streams is double a count of the spatial streams.

10. The apparatus of claim 1, wherein the SC PHY transmitter comprises a SC Single User (SU) transmitter to generate the plurality of space-time streams for a single user.

11. The apparatus of claim 1, wherein the SC PHY transmitter comprises a SC Multi-User (MU) transmitter to generate the plurality of space-time streams for a plurality of users.

12. The apparatus of claim 11, wherein the SC MU transmitter comprises a plurality of processing blocks to generate a respective plurality of space-time stream sets, a processing block of the plurality of processing blocks comprising the LDPC encoder, the stream parser, the plurality of constellation mappers, the STBC encoder, and the plurality of GI inserters to generate a space time-stream set of the plurality of space-time stream sets based on a PSDU for a user of the plurality of users, and wherein the transmit chain mapper is to map the plurality of space-time stream sets to the plurality of transmit chains.

13. The apparatus of claim 1 comprising the plurality of transmit chains to transmit the SC transmission.

14. The apparatus of claim 13 comprising a plurality of antennas connected to the plurality of transmit chains, a memory, and a processor to execute instructions of an Operating System (OS).

15. A product comprising one or more tangible computer-readable non-transitory storage media comprising computer-executable instructions operable to, when executed by at least one processor, enable the at least one processor to cause a Single Carrier (SC) Physical Layer (PHY) transmitter to:
encode data of a PHY Service Data Unit (PSDU) into encoded bits according to a Low-Density Parity-Check (LDPC) code;
distribute the encoded bits to a plurality of spatial streams;
map the encoded bits in the plurality of spatial streams to constellation symbols in the plurality of spatial streams;
encode the constellation symbols in the plurality of spatial streams into a plurality of space-time streams according to a space-time block code;
insert Guard Interval (GI) sequences into the plurality of space-time streams, inserting the GI sequences comprises inserting a GI sequence of the GI sequences into a respective space-time stream of the plurality of space-time streams by prepending each SC symbol block of a plurality of SC symbol blocks in the space-time stream with the GI sequence; and
map the plurality of space-time streams, which comprise the GI sequences, to a plurality of transmit chains.

16. The product of claim 15, wherein the instructions, when executed, cause the SC PHY transmitter to interleave, on a SC symbol block basis, the constellation symbols in the plurality of spatial streams.

17. The product of claim 16, wherein the instructions, when executed, cause the SC PHY transmitter to interleave the constellation symbols in the plurality of spatial streams according to a 64 Quadrature Amplitude Modulation (QAM) scheme.

18. The product of claim 16, wherein the instructions, when executed, cause the SC PHY transmitter to interleave the constellation symbols in the plurality of spatial streams prior to encoding of the constellation symbols in the plurality of spatial streams into the plurality of space-time streams.

19. The product of claim 15, wherein the instructions, when executed, cause the SC PHY transmitter to encode the data of the PSDU into an integer number of codewords and SC symbol blocks.

20. The product of claim 15, wherein the instructions, when executed, cause the SC PHY transmitter to generate the plurality of space-time streams for a single user.

21. The product of claim 15, wherein the instructions, when executed, cause the SC PHY transmitter to generate the plurality of space-time streams for a plurality of users.

22. An apparatus comprising:
means for causing a Single Carrier (SC) Physical Layer (PHY) transmitter to encode data of a PHY Service Data Unit (PSDU) into encoded bits according to a Low-Density Parity-Check (LDPC) code;
means for causing the SC PHY transmitter to distribute the encoded bits to a plurality of spatial streams;
means for causing the SC PHY transmitter to map the encoded bits in the plurality of spatial streams to constellation symbols in the plurality of spatial streams;
means for causing the SC PHY transmitter to encode the constellation symbols in the plurality of spatial streams into a plurality of space-time streams according to a space-time block code;
means for causing the SC PHY transmitter to insert Guard Interval (GI) sequences into the plurality of space-time streams, inserting the GI sequences comprises inserting a GI sequence of the GI sequences into a respective space-time stream of the plurality of space-time streams by prepending each SC symbol block of a plurality of SC symbol blocks in the space-time stream with the GI sequence; and
means for causing the SC PHY transmitter to map the plurality of space-time streams, which comprise the GI sequences, to a plurality of transmit chains.

23. The apparatus of claim 22 comprising means for causing the SC PHY transmitter to interleave, on a SC symbol block basis, the constellation symbols in the plurality of spatial streams.

\* \* \* \* \*